(12) United States Patent
Numano et al.

(10) Patent No.: US 6,313,898 B1
(45) Date of Patent: Nov. 6, 2001

(54) LIQUID CRYSTAL DISPLAY DEVICE HAVING INTERMEDIATE ALIGNMENT FILM IN A REGION BETWEEN ADJACENT PIXELS

(75) Inventors: Yoshinori Numano; Akira Tsumura; Toshinori Iwasa; Masaya Mizunuma, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/210,884

(22) Filed: Dec. 15, 1998

(30) Foreign Application Priority Data

Jun. 23, 1998 (JP) .................................. 10-175849

(51) Int. Cl.$^7$ ................................................ G02F 1/1337
(52) U.S. Cl. ............................................................. 349/129
(58) Field of Search ................................... 349/126, 191, 349/129, 39

(56) References Cited

U.S. PATENT DOCUMENTS

| | | | |
|---|---|---|---|
| 5,579,141 | * 11/1996 | Suzuki et al. | 359/75 |
| 5,585,951 | * 12/1996 | Noda et al. | 349/122 |
| 5,594,570 | * 1/1997 | Hirata et al. | 349/129 |
| 5,648,829 | * 7/1997 | Yano | 349/129 |
| 5,710,611 | * 1/1998 | Suzuki et al. | 349/129 |
| 5,726,728 | * 3/1998 | Kondo et al. | 349/156 |
| 5,796,458 | * 8/1998 | Koike et al. | 349/126 |
| 6,040,885 | * 3/2000 | Koike et al. | 349/129 |
| 6,091,470 | * 7/2000 | Fujikawa et al. | 349/122 |
| 6,195,147 | * 2/2001 | Asao et al. | 349/133 |

FOREIGN PATENT DOCUMENTS

| | | |
|---|---|---|
| 5-5886 | 1/1993 | (JP) . |
| 7-84284 | 3/1995 | (JP) . |
| 7-159787 | 6/1995 | (JP) . |
| 7-234408 | 9/1995 | (JP) . |
| 9-61822 | 3/1997 | (JP) . |

\* cited by examiner

Primary Examiner—James A. Dudek
Assistant Examiner—Andrew Schechter
(74) Attorney, Agent, or Firm—Oblon, Spivak, McClelland, Maier & Neustadt, P.C.

(57) ABSTRACT

A liquid crystal displaying apparatus high in display quality is provided which is high in aperture ratio and is free from the cross talk. In an liquid crystal displaying apparatus of the present invention, having an array substrate provided with a plurality of scanning wirings and a plurality of signal wirings, active elements, pixel electrodes, and a first alignment film, and an counter substrate provided with a common electrode and a second alignment film, and a liquid crystal layer where the liquid crystal molecule is aligned by the first and second alignment films positioned on a space between the array substrate and the counter substrate, a third alignment film where mutually different distortion is given to the liquid crystal molecule is formed about the intermediate region between the adjacent pixel electrodes.

5 Claims, 23 Drawing Sheets

LIQUID CRYSTAL DISPLAY DEVICE HAVING INTERMEDIATE ALIGNMENT FILM IN A REGION BETWEEN ADJACENT PIXELS

BACKGROUND OF THE INVENTION

The present invention relates a liquid crystal displaying apparatus, and more particularly, to an active matrix type liquid crystal displaying apparatus.

An array substrate to be used in the liquid crystal displaying apparatus of the conventional active matrix type liquid crystal apparatus is arranged in a plurality of scanning wirings and a plurality of signal wirings respectively in a row direction and a column direction on an insulating substrate. One pixel composed of a thin film transistor (hereinafter referred to as TFT) as active element to be controlled by the scanning wiring and the signal wiring and a pixel electrode to be connected with TFT are formed in the crossing position between the scanning wiring and the signal wiring with an alignment film (first alignment film) being formed on the pixel. Another substrate (hereinafter referred to as counter substrate) for interposing the liquid crystal has a common electrode on an insulating substrate, and an alignment film (second alignment film) is formed on it. An array substrate and an counter substrate interposes a liquid crystal composition in a gap between the array substrate and the counter substrate with a face where the aforementioned pixel electrode is formed and a face where the common electrode is formed being confronted with each other. A "TN" liquid crystal where a liquid crystal molecules are twisted by 90 degrees in a thickness direction, because the alignment film is normally aligned in a direction deviated by 90 degrees on the array substrate side and the counter substrate side.

In a liquid crystal displaying apparatus of such a TN type, leaking light comes out from a gap; which is located between the pixel electrode, and the scanning wiring and the signal wiring in the periphery thereof. In order to prevent the leaking light by removing the gap, and at the same time, a disclination to be caused by the lateral direction electric field from the scanning wiring and the signal wiring, and the level difference of the pixel electrode end portion, the transparent insulating film is formed of a thick film of 1 $\mu$m or more. There is disclosed an art of forming the pixel electrode on the scanning wiring and the signal wiring through the transparent insulating film. Thus, the disclination by the lateral direction electric field from the scanning wiring and the signal wiring is prevented from being caused, and at the same time, the pixel electrode can be superposed on the scanning wiring and the signal wiring, whereby the aperture ratio of one pixel can be made larger.

FIG. 23 shows a sectional view of one pixel of the liquid crystal displaying apparatus using an art of forming on the scanning wiring and the signal wiring through the transparent insulating film the conventional pixel electrode described in, for example, Japanese Unexamined Patent Publication No. 84284/1995. In FIG. 23, reference numeral 1 is a transparent substrate, reference numeral 2 is a scanning wiring, reference numeral 3 is a storage capacitance wiring (hereinafter referred to as Cs wiring), reference numeral 4 is a gate insulating film, reference numeral 5 is a semiconductor layer serving as a channel, reference numeral 6 is a semiconductor layer for ohmic contact, reference numeral 7 is a signal wiring, reference numeral 8 is a drain electrode, reference numeral 9 is a passivation film, reference numeral 10 is a transparent resin film made of an organic material, reference numeral 12 is a pixel electrode, reference numeral 14 is a liquid crystal molecule. Reference numeral 18 is a common electrode on the side of the counter substrate. The alignment film exists on both the array substrate side and the counter substrate side. A glass substrate for composing the counter substrate, a black matrix and the coloring layer are omitted for simplification.

In the conventional liquid crystal displaying apparatus shown in FIG. 23, the space of the adjacent pixel electrodes becomes approximately several micro meters on the signal wiring 7. In the conventional example, the relationship of the space between the liquid crystal thickness d and the pixel electrode is preferable to have the following relation;

$$L/d \leq 0.9 \text{ through } 0.4$$

When the thickness d of, for example, the liquid crystal is 5 $\mu$m, L becomes 2 through 5 $\mu$m. When the space between the pixel electrodes becomes narrow, the liquid crystal molecule of the pixel end portion receives the influences of the lateral electric field from the adjacent pixel electrode. Especially, when a driving system of reversing the polarity of the signal for each column, the lateral electric field twice the longitudinal electric field to be added to the pixel electrode and the opposite electrode is added. In the conventional liquid crystal displaying apparatus shown in FIG. 23, an arrow mark shows the alignment direction when the array substrate surface of the aligning (hereinafter referred to as rubbing treatment) for aligning the liquid crystal is made upward. When the aligning in such one direction is conducted, a phenomenon called reverse tilt domain in the liquid crystal molecule in a direction different from that of the direction of the pretilt when the lateral electric field is added between the adjacent pixels. The disclination is caused on the boundary to the normal tilt region by the reverse tilt. The disclination is decided in the producing position by physical values such as lateral electric field strength between the adjacent pixel electrodes, anchoring strength by the aligning, pretilt angle, and viscosity of the liquid crystal molecule 14. By the condition, the superposing amount between the pixel electrode on the side where the disclination is easy to be caused and the wiring has to be made larger. When the superposing between the pixel electrode and the wiring is made larger, an area for transmitting the light for increasing the light shielding area become smaller, and the aperture ratio is reduced. When only the superposing amount between the pixel electrode on the side where the disclination is easy to cause and the wiring are made larger, a coupling capacitance (hereinafter referred to as Cds) to be caused by the superposing portion between the pixel electrode and the signal wiring becomes different in the right and left superposing portion especially with the superposing amount between the signal wiring and the pixel electrode being made larger only on the side where the disclination is easy to cause. The electric potential of the pixel electrode receives more through the Cds the influences in the signal changes in the signal wiring where the superposing amount is larger. In the TFT-LCD for displaying the TN mode liquid crystal in a normally white mode concretely by the influences of signal changes in the signal wiring through the Cds, the brightness of the pixel of the gray displaying portion connected with the signal line for displaying the black window becomes lower as compared with that of the portion where the black window is not displayed in a case where the black window is displayed with the gray display as background, with a problem of causing the cross talk.

In the conventional liquid crystal displaying apparatus as described, it is necessary to make larger the superposing amount between the wiring and the pixel electrode on the side where the disclination is easy to produce, the disclination being caused by the production of the reverse tilt region due to the lateral electric field between the pixel electrodes when the disclination is restrained by shielding light.

Thus, the aperture ratio of the pixel is reduced, and there arises a problem of causing the cross talk.

Considering the problems of the conventional active matrix type liquid crystal displaying apparatus, an object of the present invention is to provide a liquid crystal displaying apparatus of high displaying quality, which is high in aperture ratio and is free from the cross talk.

SUMMARY OF THE INVENTION

In accordance with one embodiment of the present invention, there is provided a liquid crystal displaying apparatus where a third alignment film for giving to the liquid crystal molecule the mutually different distortions about the intermediate region between the adjacent pixels in a liquid crystal displaying apparatus comprising;

(a-1) a plurality of scanning wirings and a plurality of signal wirings to be arranged respectively in a row direction and a column direction, (a-2) an active element to be controlled by the scanning wiring and the signal wiring to be arranged in a matrix shape, (a-3) and a pixel electrode to be connected with the active element, the pixel electrode being superposed on the scanning wiring and the signal wiring through the transparent insulating film, and (a-4) an array substrate having a first alignment film formed to cover the pixel electrode, (b-1) a common electrode to be placed opposite to the pixel electrode, and (b-2) an counter substrate having an alignment film formed on the common electrode, (c) a liquid crystal layer where the liquid crystal molecule is aligned by the first and second alignment films provided in a space between the array substrate and the counter substrate.

In an intermediate alignment film for giving the distortions to the alignment of the liquid crystal molecule of the liquid crystal layer within a region (hereinafter referred to intermediate region) between the pixels of the present invention has the disclination produced in advance in the intermediate region outside of the pixel electrode, and the reverse tilt region to be caused by the lateral electric field is provided not to enter the pixel. As a means for giving distortions to the alignment of the liquid crystal molecule of the liquid crystal layer are provided a process of making the alignment direction of the alignment film, the anchoring strength, the pretilt angle, and the surface shape different locally or for each pixel unit, and a process of combining them.

The present invention relates to a liquid crystal displaying apparatus where in the adjacent pixel electrodes, the lateral electric field from the adjacent pixel electrode is lowered by making the longitudinal electric field stronger in the pixel electrode end on the side where the disclination is caused.

In accordance with another embodiment of the present invention, there is provided a liquid crystal displaying apparatus where first and second alignment films for giving to the liquid crystal molecule the mutually different distortions about between the adjacent pixels in a liquid crystal displaying apparatus, comprising;

(a-1) a plurality of scanning wirings and a plurality of signal wirings to be arranged respectively in a row direction and a column direction, (a-2) an active element to be controlled by the scanning wiring and the signal wiring to be arranged in a matrix shape, (a-3) and a pixel electrode to be connected with the active element, the pixel electrode being superposed on the scanning wiring and the signal wiring through the transparent insulating film, and (a-4) an array substrate having a first alignment film formed to cover the pixel electrode, (b-1) a common electrode to be placed opposite to the pixel electrode, and (b-2) an counter substrate having a second alignment film formed on the common electrode, (c) a liquid crystal layer where the liquid crystal molecule is aligned by the first and second alignment films provided in a space between the array substrate and the counter substrate.

The alignment film for giving the different distortions to the liquid crystal molecule about between the adjacent pixel electrodes of the present invention has the disclination line produced in advance in the intermediate region outside of the pixel electrode, and the reverse tilt region to be caused by the lateral electric field is provided not to enter the pixel.

In accordance with still another embodiment of the present invention, there is provided a method for manufacturing an array substrate comprising steps of:

(a) forming the scanning wiring and the storage capacitance on the transparent insulating substrate, (b) forming a gate insulating film by covering the scanning wiring and the storage capacitance wiring and the transparent insulating substrate, (c) forming in this sequence a semiconductor layer which becomes a channel and a semiconductor layer for ohmic contact on the scanning wiring, (d) forming the signal wiring and the drain electrode and removing the unnecessary portion of the semiconductor layer for the ohmic contact to have a TFT, (e) forming in this sequence the protective film and the transparent insulating film by covering the TFT, the signal wiring and the drain electrode, (f) forming a contact hole in the protective film and the transparent insulating film, (g) forming photo resist after the pixel electrode film is filmed on the transparent insulating film, (h) etching the transparent insulating film with the pixel electrode as a mask to form the concave portion on the periphery of the pixel electrode, (i) a step of forming the alignment film by covering the pixel electrode, the signal wiring and the contact hole, and (j) rubbing the alignment film to have an intermediate alignment film where the strength of the alignment by the rubbing to the concave is different from that of the other region.

The method for manufacturing an array substrate the present invention may includes the above-mentioned steps (a) to (e), and further includes steps of;

(k) forming the photo resist on the transparent insulating film, and removing the photo resist with the photo resist of one portion on the side where the disclination in a position for forming the pixel electrode later remaining, (l) forming the contact hole in the protective film and the transparent insulating film, and increasing the thickness in one portion of the transparent insulating film on the storage capacitance wiring by etching the transparent insulating film under the conditions where the selection ratio by the etching of the transparent insulating film, the protective film or the gate insulating film is 1:1 or more, and the etching rate of the protective film or the gate insulating film is fast, (m) forming the pixel electrode, (n) forming the alignment film by covering the pixel electrode, the signal wiring and the contact hole, (o) rubbing the alignment film to make the alignment strength, by the rubbing to one portion of the transparent insulating film, different from that of the other region, The method for manufacturing an array substrate of the present invention may includes the above-mentioned steps (a) to (f), and further includes steps of;

(p) forming a first pixel electrode film on the transparent insulating film and forming the photo resist so that only the end portion on the side, where the disclination in a portion which becomes the pixel electrode later is caused, of the first pixel electrode film, may superpose partially on the signal wiring, (q) forming a second pixel electrode film on the first pixel electrode film after forming on the desired pattern the first pixel electrode film, and etching the photo resist as a mask to have the two-layer pixel electrode to increase the thickness in one portion of the pixel electrode, (r) forming the alignment film by covering the pixel electrode, the signal wiring and the contact hole, (t) rubbing the alignment film and making the strength of the alignment, by the rubbing to one portion of the pixel electrode, different from that of the other region.

When the disclination based on the production of the reverse tilt region due to the lateral electric field between the pixel electrodes is light-screened with the wiring in a liquid crystal displaying apparatus using an art of forming on the scanning wiring and the signal wiring the conventional pixel electrode through the transparent insulating film, it is necessary to make the superposing amount larger between the pixel electrode on the side where disclination is easy to produce and the wiring, with a problem of reducing the aperture ratio of the pixel and reducing the cross talk.

By provision of the intermediate alignment film and unevenness for giving the distortions to the alignment of the liquid crystal molecule of the liquid crystal layer in the alignment film in the intermediate region between the adjacent pixel electrodes in the present invention, the disclination is caused in advance in a region where the light is shielded with the signal wiring. Or by forming the alignment film for giving to the liquid crystal molecule the mutually different distortions about between the adjacent pixels, the disclination is caused in advance in a region where the light is shielded by the signal wiring. As the such a disclination is fixed in position by the energies of the alignment distortion to be given by the liquid crystal alignment function of the alignment film, it is not entered into the pixel electrode, not a region where the light is shielded by receiving the influences of the lateral electric field. Namely, a disclination is given between them by giving the mutually different distortions to the alignment of the liquid crystal molecule. The position of the disclination is fixed to only the intermediate region between the pixel electrodes, it is not necessary to make the superposing amount between the pixel electrode and the wiring larger. Thus a liquid crystal displaying apparatus which is high in aperture ratio and is free from the cross talk can be obtained.

In the present invention, the disclination is caused in advance in the intermediate region between the pixel electrodes by increasing the longitudinal electric field strength and reducing the influences of the lateral electric field by approaching towards the opposite electrode, not towards the end of the adjacent pixel electrode the end portion of the pixel electrode on the side where the disclination is caused. Thus, it is not necessary to make the superposing amount between the pixel electrode and the wiring, whereby a liquid crystal displaying apparatus which is high in aperture ratio and is free from the cross talk can be provided.

DETAILED DESCRIPTION OF THE INVENTION

The embodiments of this invention will be described in further detail with reference to the accompanying drawings.

EMBODIMENT 1

Figure 1:
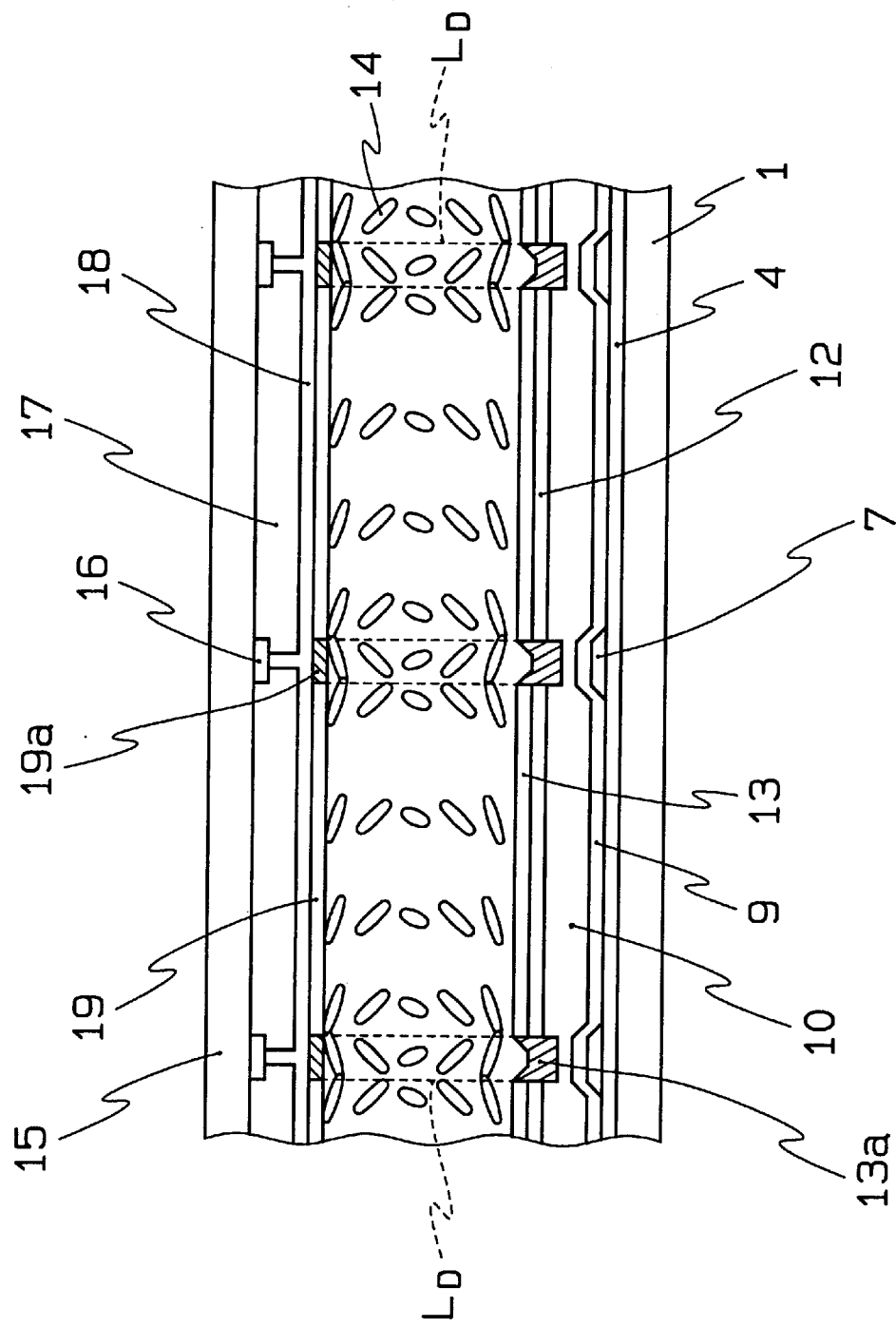
FIG. 1 is a cross sectional view showing a liquid crystal displaying apparatus of EMBODIMENT 1 of the present invention.
Figure 2:
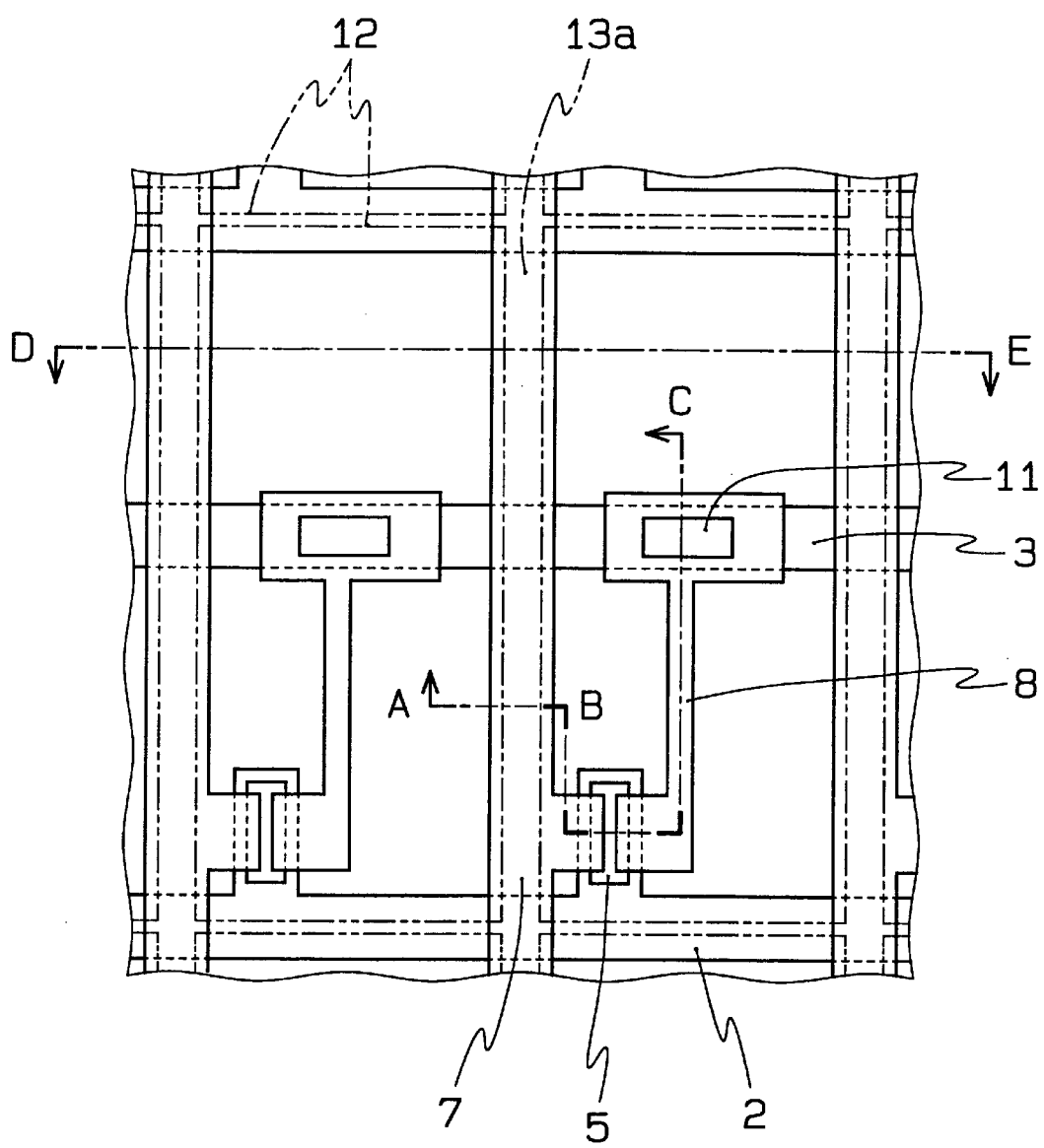
FIG. 2 is a plan view showing a liquid crystal displaying apparatus of EMBODIMENT 1 of the present invention.
Figure 3A:
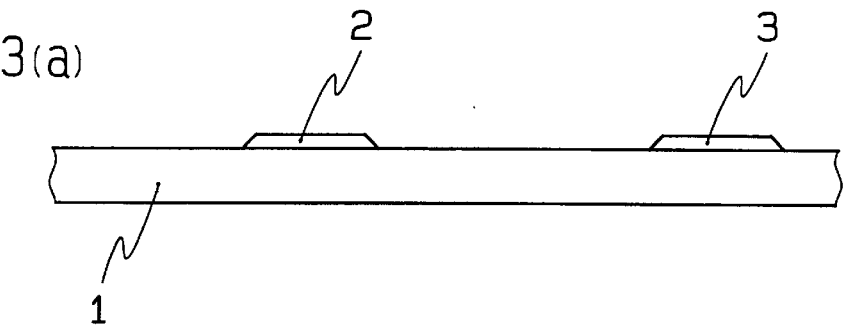
FIG. 3($a$)to 3($d$) are cross sectional views, each showing a flow for manufacturing an array substrate of EMBODIMENT 1 of the present invention.
Figure 3B:
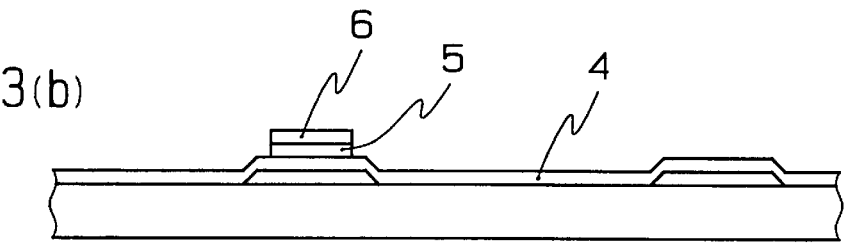
Figure 3C:
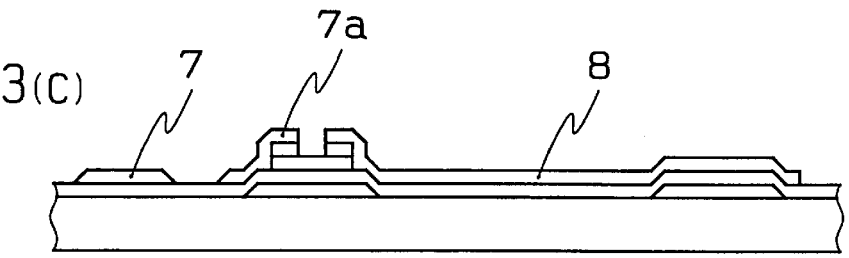
Figure 3D:
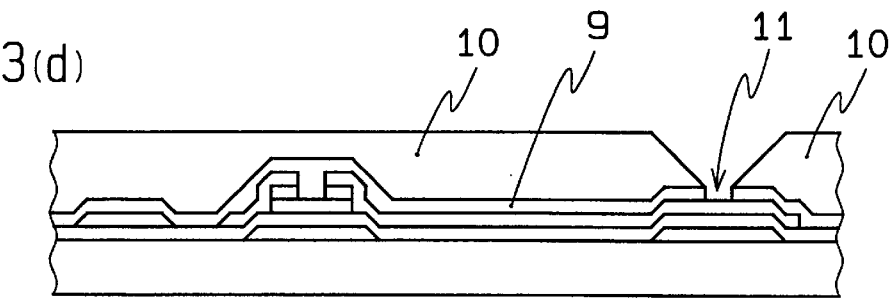
Figure 4A:
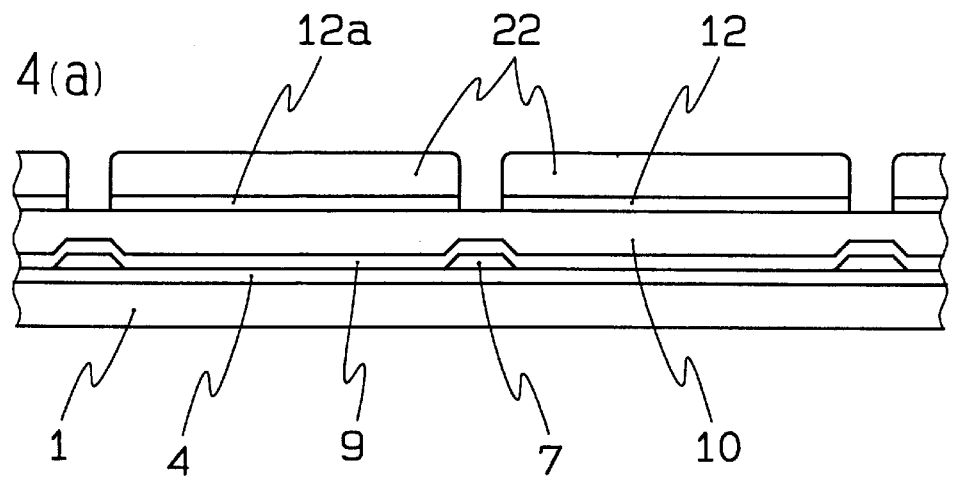
FIGS. 4($a$) to 4($c$)are cross sectional views, each showing a flow for manufacturing an array substrate of EMBODIMENT 1 of the present invention.
Figure 4B:
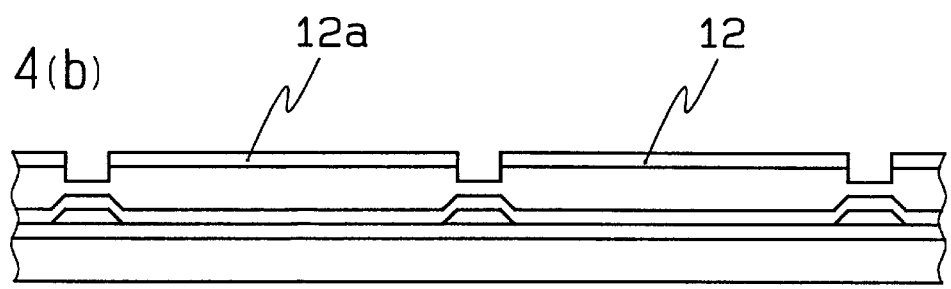
Figure 4C:
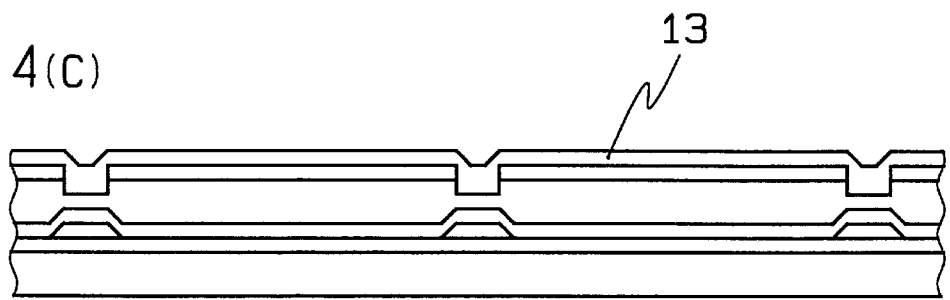
Figure 5A:
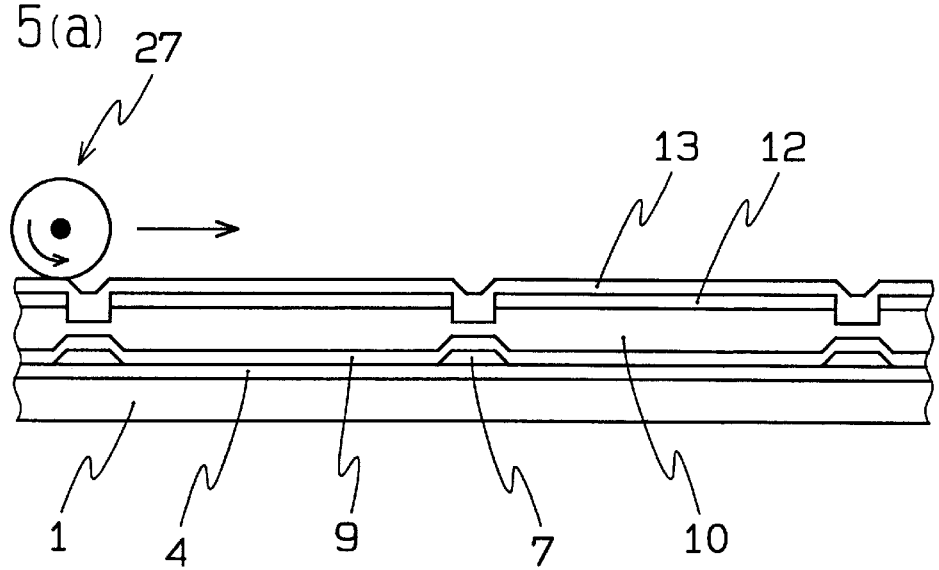
FIGS. 5($a$) and 5($b$) are cross sectional views, each showing a flow for manufacturing an array substrate of EMBODIMENT 1 of the present invention.
Figure 5B:
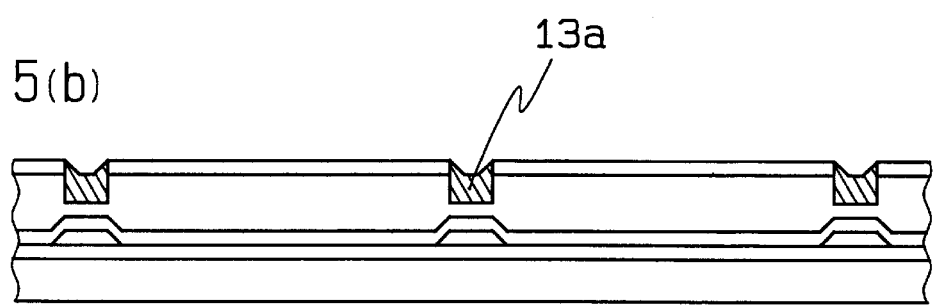
Figure 23:
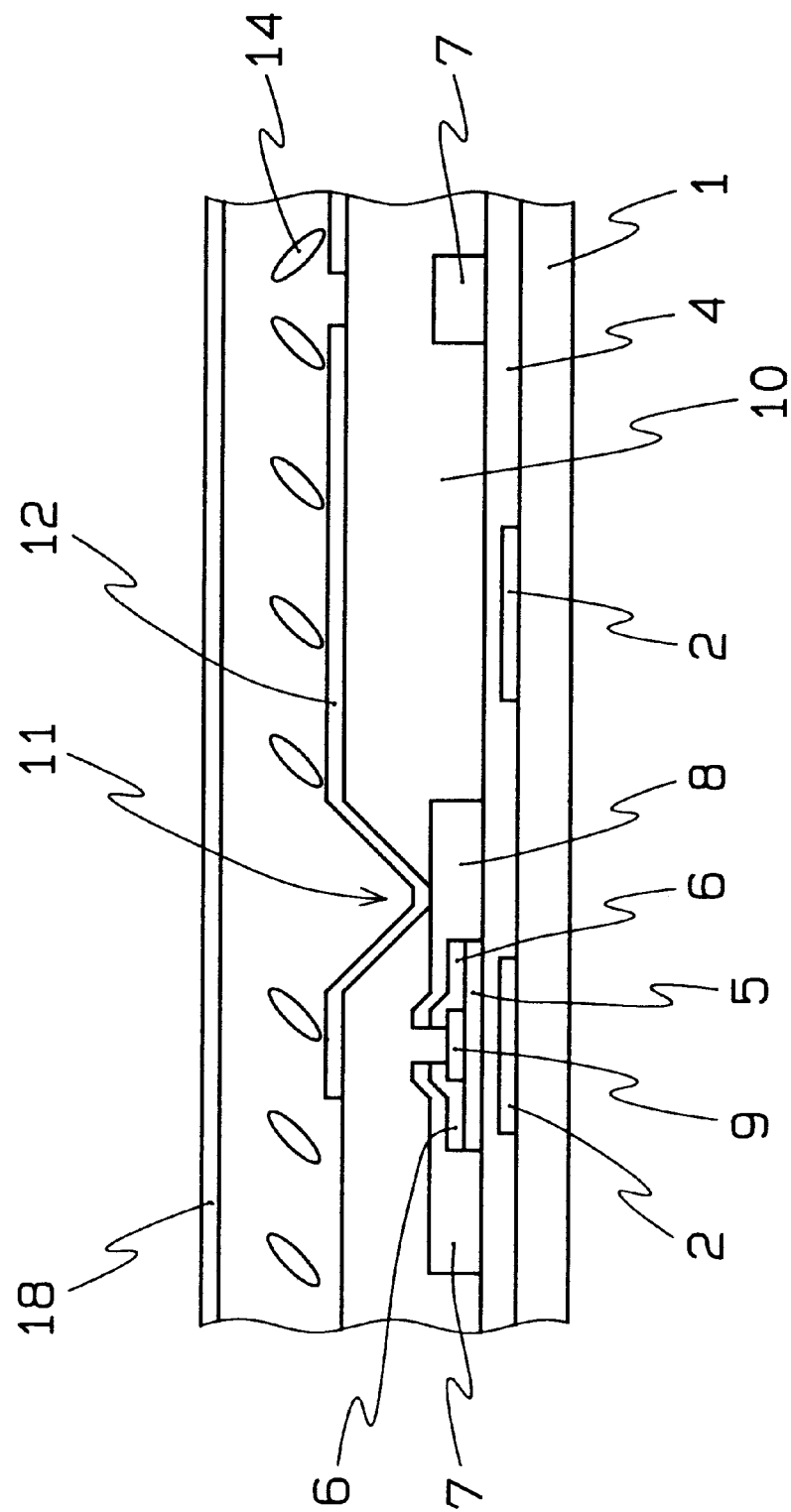
FIG. 23 is a cross sectional view showing a conventional liquid crystal displaying apparatus.

FIG. 1 is a sectional illustrating view of the major portions of a liquid crystal displaying apparatus in EMBODIMENT 1 of this invention. FIG. 1 is a sectional illustrating view taken along a line of D–E of FIG. 2. Referring to FIG. 1 and FIG. 2, reference numerals 13a and 19a are intermediate alignment films (third alignments), reference numeral 15 is a transparent substrate, reference numeral 16 is a black matrix, reference numeral 17 is a colored layer, reference character $L_D$ shows a producing position of the disclination. The same numerals are given respectively to the same elements as those of elements shown in FIG. 23 (the same even in the following drawings). In FIG. 2, elements on the side of the counter substrate, namely, transparent substrate 15, black matrix 16, colored layer 17, common electrode 18, alignment film 19 on the side of the counter substrate, and intermediate alignment film 19a on the side of the counter substrate are not shown. The pixel electrodes 12 and 12a show their positions with two dot-chain lines. An intermediate alignment 13a is formed in a portion where the light is screened with the signal wiring between the adjacent pixel electrodes 12 and 12a. The intermediate alignment film 13a is an alignment film for giving the distortions to the alignment of the liquid crystal molecule 14 of the liquid crystal layer. If the intermediate alignment film 13a is an alignment film for causing the disclination by giving the distortion to the alignment of the liquid crystal molecule 14 on the boundary to the other alignment film 13, it can be an intermediate alignment film based on any alignment means. It is generally preferable to be an alignment film which is subjected to the aligning treatment different from that of the other region upon the alignment film or an alignment film having the surface shape different from that of the other region of the alignment film. In EMBODIMENT 1, the intermediate alignment film is provided in the same pattern in a region corresponding to the same location with both the substrates of the counter substrate between the array substrate and the counter substrate in the upper portion, the same effect can be obtained even if it is provided only on either of them.

Although the liquid crystal molecule rises in the normal tilt direction according to the pretilt given by the alignment film in advance, the liquid crystal molecule rises in the tilt direction reverse to the pretilt by the compulsory alignment of the lateral electric field, thereby causing so-called reverse tilt region when the alignment film does not give any distortions to the liquid crystal molecule due to strong lateral electric field added to the liquid crystal molecule with the adjacent pixel space being narrow in the signal wiring. The disclination which is the discontinuity of the alignment of the liquid crystal molecule, is caused on the boundary of the reverse tile region and the normal tilt region, thus causing the light leaking, disclination On the other hand, when the disclination is kept causing by giving the distortions to the alignment of the liquid crystal molecule of the liquid crystal layer in advance, the disclination hardly moves from the original position even if the lateral electric field is applied upon it. It is considered that the disclination to be caused by the alignment distortions of the liquid crystal molecule given by the alignment film is in a stable state of energy as compared with that by the lateral electric field. Namely, even if the disclination is caused by the lateral electric field, the disclination existing due to the alignment distortions given already by the alignment film has to be disappeared. As the result, it is considered that the disclination is fixed.

One example of the manufacturing process in this embodiment will be described according to FIGS. 3(a) to 3(d), 4(a) to 4(c), 5(a) and 5(b) and 6(a) to 6(c). A manufacturing process of the array substrate will be described according to FIGS. 3, 4 and 5. FIGS. 3(a) through 3(d) is a sectional illustrating view taken along a line of A–B–C of FIG. 2 in EMBODIMENT 1 of the present invention. This scanning wiring 2 and the Cs wiring 3 are formed with, for example, Cr on the insulting transparent substrate 1 (FIG. 3(a)). For example, SiN as the gate insulating film 4, for example amorphous Si (hereinafter referred to as a-Si) as a semiconductor layer 5 which becomes channel, and for example, $n^+$ a-Si with P ion being doped as a semiconductor layer 6 with impurity ion being doped for forming the signal wiring metal and the ohmic contact are continuously filmed. The $n^+$ a-Si and a-Si are removed (FIG. 3(b)) except for a portion which becomes TFT is removed (FIG. 3(b)). The signal wiring 7 is formed with, for example, Cr and the drain electrode 8 is formed with, for example, Cr, and at the same time, the unnecessary $n^+$ a-Si is removed (FIG. 3(c)). For example, SiN is filmed as a passivation film 9 for protecting the channel portion which is free from the $n^+$ a-Si. Then, after, for example, acrylic resin as a transparent insulating film 10 is coated by, for example, a spin coating method, a contact hole 11 necessary for the connection with the pixel electrode, a terminal for applying the signal upon the scanning wiring and the signal wiring are removed. The passivation film is removed by dry etching by using, for example, $CF_4$ gas with the transparent insulating film as resist (FIG. 3(d)). The D-E section shown in FIG. 2 will be described for explaining the functions of the present invention will be described hereinafter. The ITO such as pixel electrode 12 is filmed and it is pattern-formed in the desired shape. The partial portion of the transparent insulating film 10 is removed by etching with using, for example, $CF_4$ gas or the like with the resist 22 remaining (FIG. 4(a)) to be used in pattern-forming the pixel electrode 12. Thus, the concave portion is formed in the vicinity of the pixel electrode 12 (FIG. 4(b)). After the removal of the resist 22, the transparent insulating film 10 can be etched with the pixel electrode 12 as a mask. Soluble polyimide is transferred by using a transfer plate for alignment film on the side of the pixel electrode surface of the array substrate, after-cure is conducted after the solution is blown with pre-curing to form polyimide film of about 100 nm thickness, i.e., the alignment film 13 (FIG. 4(c)). The aligning treatment is conducted upon the alignment film by the next process. Namely, the rubbing is treatment conducted by the rubbing roller 27 with the normal rubbing cloth being wound on the whole surface of the alignment film (FIG. 5(a)). At this time, as it becomes the concave portion between the pixel electrode 12 and 12a, the strength of the alignment by the rubbing as compared with the other region becomes different from that of the other region. As this result, the intermediate alignment film 13a different in the strength of the aligning from the region of the pixel electrode except for it is formed (FIG. 5(b)) in a region between the adjacent pixels, and in a region where the light is shielded by the signal wiring 7.

Figure 6A:
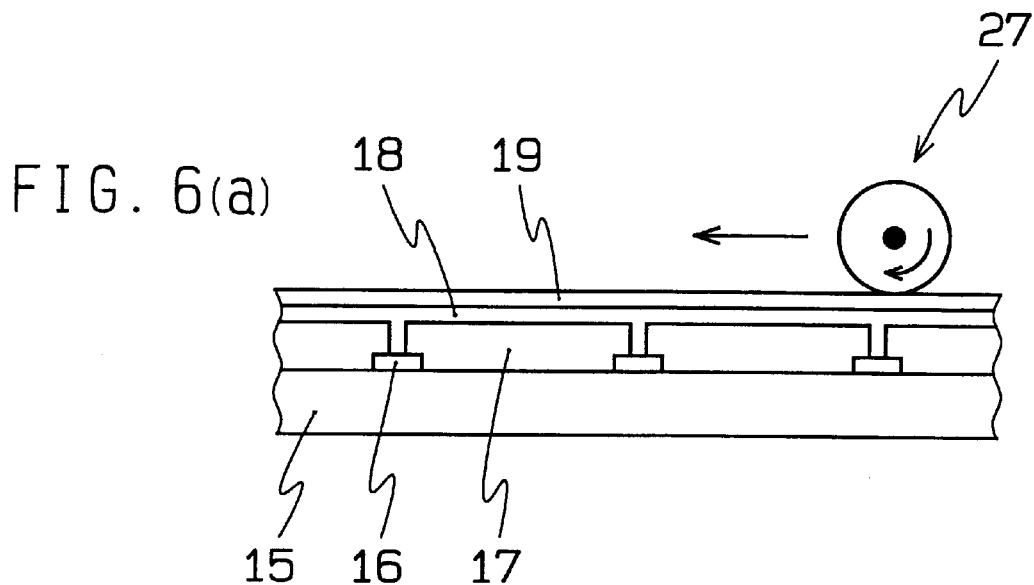
FIGS. 6($a$) to 6($c$) are cross sectional views, each showing a flow for manufacturing an counter substrate of EMBODIMENT 1 of the present invention.
Figure 6B:
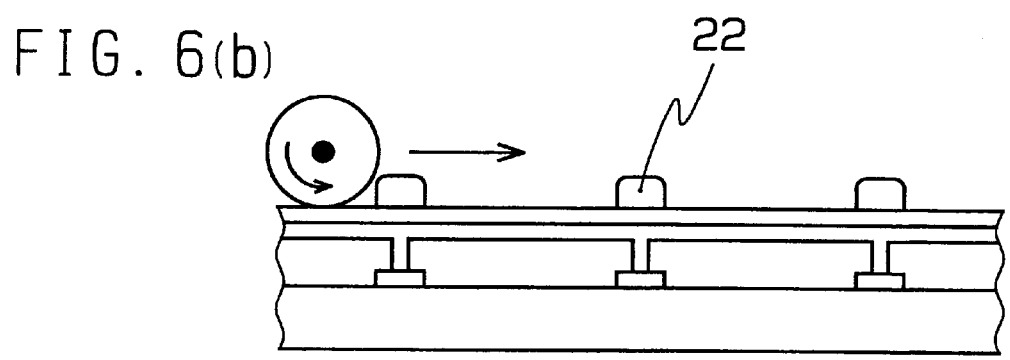
Figure 6C:
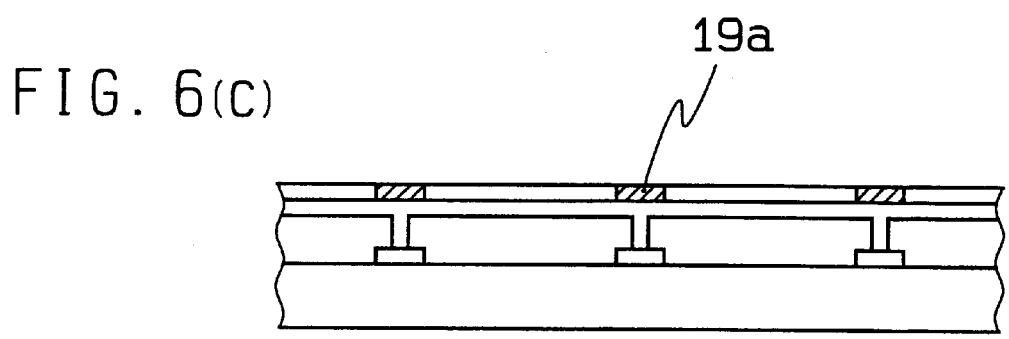

A manufacturing process of the counter substrate will be described according to FIGS. 6(a) to 6(c). In FIGS. 6(a) to 6(c), the counter substrate shows the sectional view taken along a line D-E of FIG. 2 in this EMBODIMENT 1. The counter substrate 15 is made of an insulating transparent material such as glass. Metal film (thin film of 300 nm) such as Cr or the like which becomes a black matrix 16 is formed by a sputtering process on it and it is patterned in grid condition by the photolithography. A colored layer 17 of red, blue and green of 1.5 μm by using the pigment scatting type resist is provided on the opening portion, and a transparent electrode 18 of 100 nm thickness is formed on it by a sputtering process to have a common electrode. Further, for example, polyimide thin film of 100 nm is formed as the alignment film. Then, the surface of the alignment film is aligned in the same process as the rubbing process (FIG. 6(a)). Then, the resist 22 is formed in a portion opposite to the region of the mutually adjacent pixel 12 and 12a to rub in the direction different from the rubbing direction (FIG. 6(b)). Then, by removing the resist 22, the alignment film 19a different in the alignment direction from that of the region of the pixel electrode except for it is formed in a region between the mutually adjacent pixels 12 and 12a, and a region where the light is shielded by the signal wiring 7.

By the following process, the array substrate and the counter substrate are assembled to manufacture the active matrix type liquid crystal displaying apparatus in this embodiment. Namely, for example, epoxide bonding agent is coated except for a pouring opening as a seal material along the periphery of the alignment film 13 of the array substrate, and the spacer of grain diameter 5 μm (Micropearl (trade name) made by SEKISUI FINE CHEMICAL KABUSHIKI KAISHA) is scattered on the counter substrate. The upper and lower substrates are arranged under pressure so that the alignment direction may become 90 degrees in the respective opposite regions with the alignment films on each substrate being opposite, and the bonding agent is hardened by heating for gluing both the substrates. The liquid crystal composition where S811 (made by Merck Co.) is added by 0.1% by weight to ZLI—1565 (made by Merck Co.) is poured from the pouring opening by the normal process to have a liquid crystal layer of 5 μm thick, and then, the pouring opening is sealed with ultraviolet hardening resin. Then, polarizing plates are glued on the upper and lower substrates and an active matrix type liquid crystal displaying apparatus in EMBODIMENT 1 of the present invention is manufactured.

In a liquid crystal displaying apparatus made in this manner by the present invention, the intermediate region of the pixel electrodes 12 and 12a is subjected to the aligning treatment which is different from that is conducted the other region of the pixel elements 12 and 12a. The distortions in the alignment direction of the liquid crystal molecule on the 15 boundary different in the aligning is caused. Although the liquid crystal molecule rises in the normal tilt direction according to the pretilt given by the alignment film in advance, the liquid crystal molecule rises in the tilt direction reverse to the pretilt by the compulsory alignment of the lateral electric field, thereby causing so-called reverse tilt region. The disclination is caused on the boundary between the reverse tilt region and the normal tilt region to cause the light leaking by the disclination. On the other hand, the disclination is kept causing by giving the distortions to the alignment of the liquid crystal molecule in advance, and thus, the disclination hardly moves from the original position even if the lateral electric field is applied upon it. It is considered that the disclination to be caused by the alignment distortions of the liquid crystal molecule given by the alignment film is more in a stable state of energy than that by the lateral electric field. Namely, even if the disclination is caused by the lateral electric field, the disclination existing by the alignment distortions given already due to the alignment film has to be disappeared. As the result, it is considered that the disclination is fixed. As the producing position of the disclination can be fixed by the processing of the intermediate alignment films 13a and 19a in EMBODIMENT 1, it is not necessary to have larger superposition between the signal wiring 7 and the pixel element 12. Thus, a liquid crystal displaying apparatus which is high in aperture ratio and free from the cross talk can be obtained. In this EMBODIMENT 1, the same effect is obtained even if it is provided on the side of the array substrate although the region where the distortion is caused is provided even on the side of the counter substrate.

EMBODIMENT 2

Figure 7:
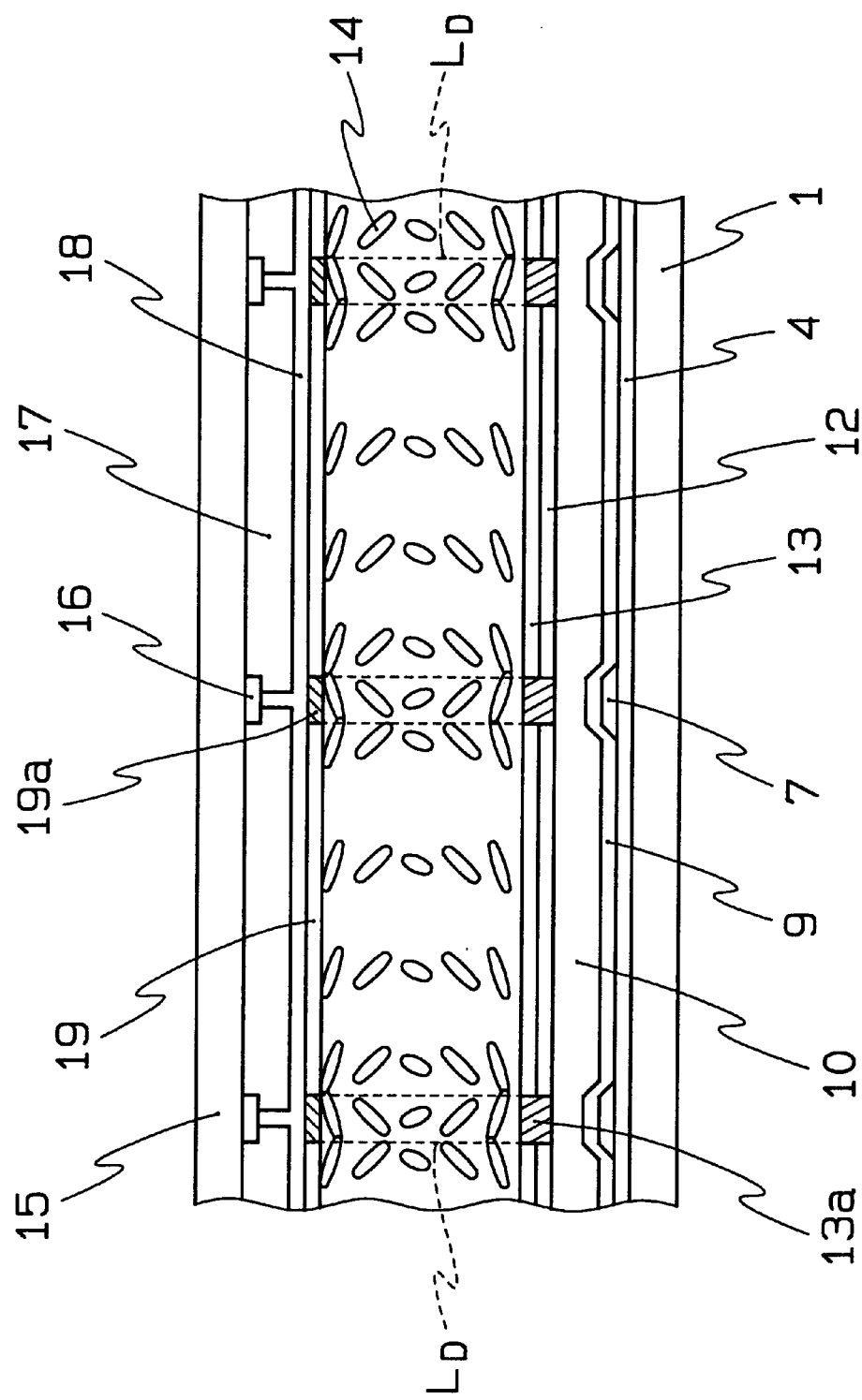
FIG. 7 is a cross sectional view showing a liquid crystal displaying apparatus of EMBODIMENT 2 of the present invention.
Figure 8A:
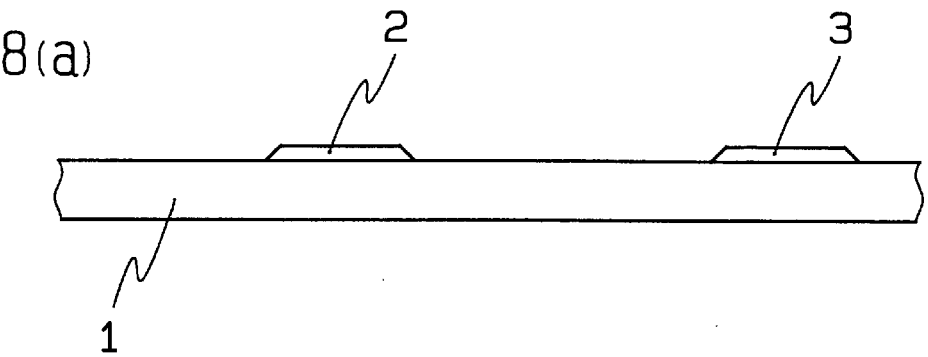
FIGS. 8($a$) to 8($c$) are cross sectional views, each showing a flow for manufacturing a liquid crystal displaying apparatus of EMBODIMENT 2 of the present invention.
Figure 8B:
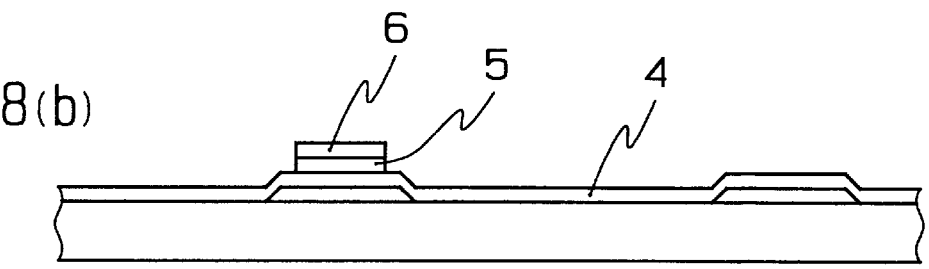
Figure 8C:
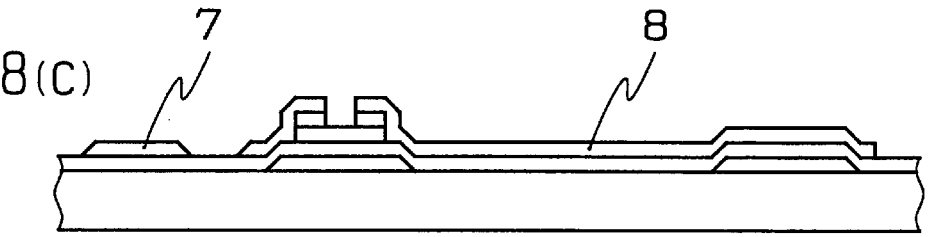
Figure 9A:
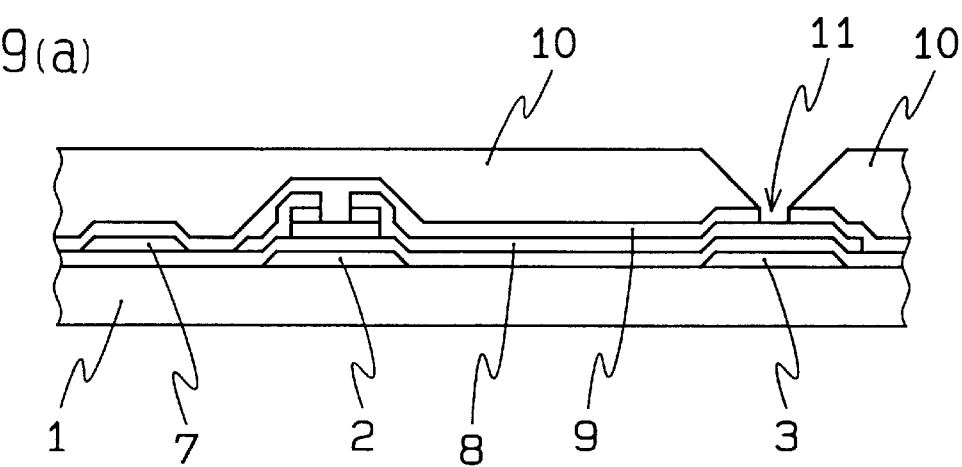
FIGS. 9($a$) and 9($b$) are cross sectional views, each showing a flow for manufacturing an array substrate of EMBODIMENT 2 of the present invention.
Figure 9B:
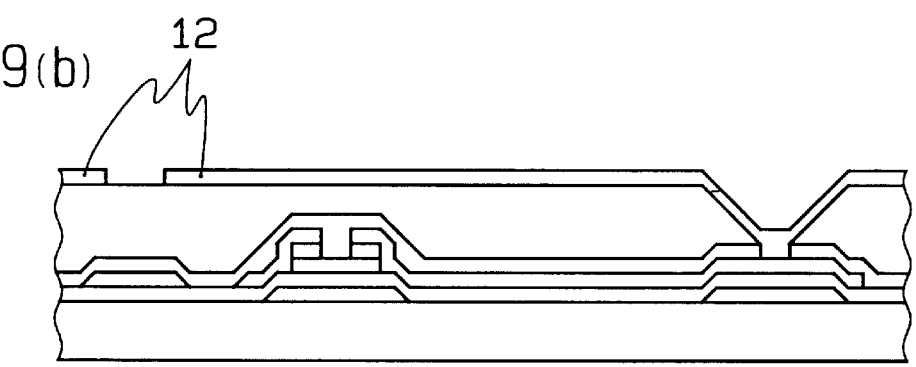
Figure 10A:
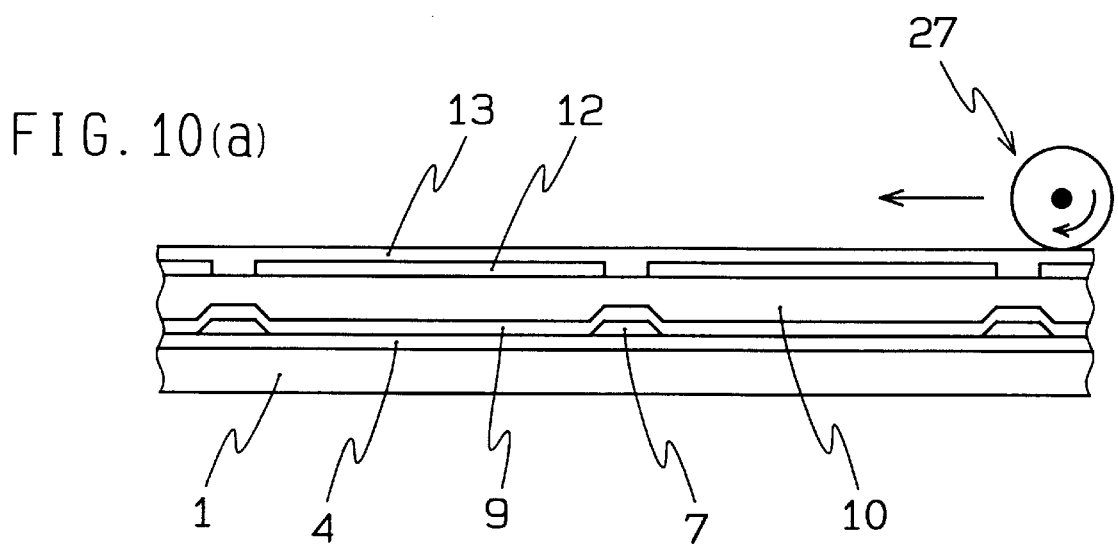
FIGS. 10($a$) to 10($c$) are cross sectional views, each showing a flow for manufacturing an counter substrate of EMBODIMENT 2 of the present invention.
Figure 10B:
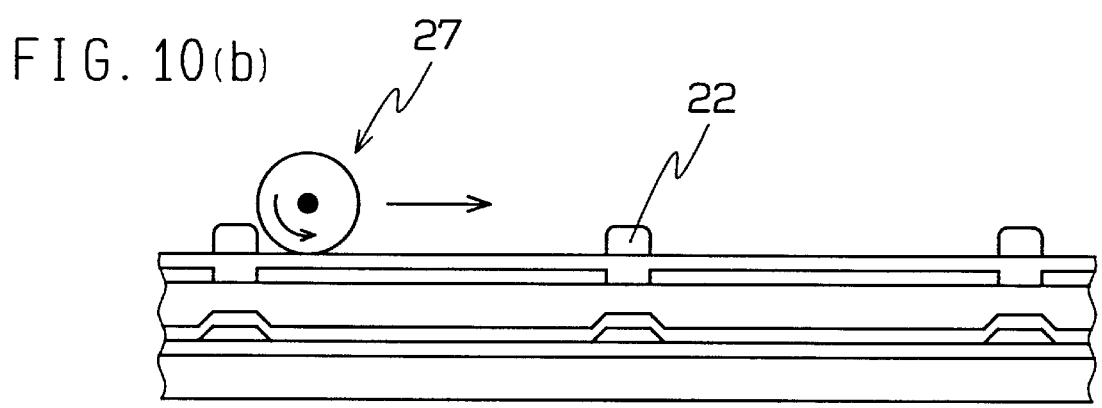
Figure 10C:
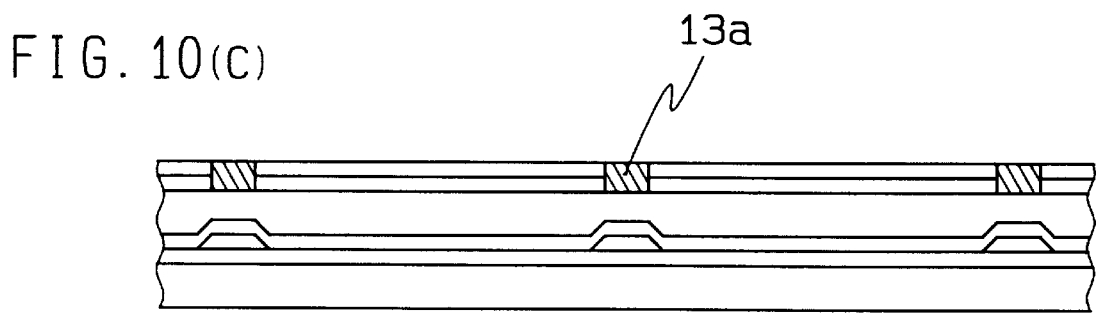

FIG. 7 shows a sectional illustrating view taken along a line of D-E (shown in FIG. 2 in EMBODIMENT 1) of EMBODIMENT 2. This embodiment is an embodiment showing another manufacturing process in EMBODIMENT 1, and is manufactured by changes in the alignment film and the aligning in EMBODIMENT 1. As the plane construction is the same as that of EMBODIMENT 1, the description is omitted. The intermediate alignment film 13a is formed in a portion where the light is shielded with the signal wiring between the adjacent pixel electrodes 12 and 12a. The intermediate alignment film 13a is an alignment film for giving the distortions to the alignment of the liquid crystal molecule 14 of the liquid crystal layer. Although the alignment film is an intermediate alignment film for causing the disclination can be an intermediate alignment film based on any alignment means if the alignment film can give the distortions to the alignment of the liquid crystal molecule 14 in the boundary portion to the other alignment film 13 to cause the disclination, it is generally preferable to be an alignment film which is subjected to the aligning treatment different from that of the other region upon the alignment film or an alignment film of the surface shape different from that of the other region of the alignment film. In EMBODIMENT 2, the intermediate alignment film is provided in the same pattern in a region corresponding to the same location with both the substrates of the array substrate and the alignment substrate in the upper portion, the same effect can be obtained even if it is provided only on either of them.

A manufacturing process of this embodiment will be described concretely.

A manufacturing process of the array substrate is shown in FIGS. 8(a) to 8(c), 9(a) and 9(b) and 10(a) to 10(c). As FIG. 8(a) through FIG. 9(a) are the same as FIGS. 3(a) through (d) of the array substrate manufacturing process in EMBODIMENT 1, the description is omitted. For example, the ITO is filmed as the pixel electrode 12 and is pattern-formed in the desired shape (FIG. 9(b)). The D-E section is described for illustrating the functions of the present invention. Soluble polyimide is transferred by using a transfer plate for alignment film on the side of the pixel electrode surface of the array substrate, after-curing is conducted after the solution is blown by pre-curing to form polyimide film of about 100 nm thickness, i.e., the alignment film 13. The aligning treatment is conducted upon the alignment film by the next process. Namely, the rubbing treatment is conducted by the rubbing roller 27 with the normal rubbing cloth being wound on the whole surface of the alignment film (FIG. 10(*a*)). Then, the exposing printing operations are conducted by coating the resist 22, and a region where the light is shielded by the signal wiring 7 and the other region where the resist is removed are formed in a region between the adjacent electrodes 12 and 12*a* covered with the resist 22. Then, the rubbing treatment is conducted again by changing the rubbing direction (FIG. 10(*b*)). Then, the washing and the drying is conducted by removing all the resist 22 by the etching. As this result, an alignment film 13*a* which is different in the aligning direction from that of the region of the pixel electrode except for it is formed (FIG. 10(*c*)) is formed in a region of one portion or all the portions between the adjacent pixels and a region where the light is shielded by the signal wiring 7. As the manufacturing process of the counter substrate is the same as that of EMBODIMENT 1, the description thereof is omitted.

The producing position of the disclination of the liquid crystal displaying apparatus by the present invention manufactured in this manner is fixed to the end of the distortion producing region. In EMBODIMENT 2 of the present invention, as the producing position of the disclination is fixed by the processing of the intermediate alignment film 13*a*, it is not necessary to have larger superposition between the signal wiring 7 and the pixel electrode 12. Thus, a liquid crystal displaying apparatus which is high in aperture ratio and is free from the cross talk can be provided.

EMBODIMENT 3

Figure 11A:
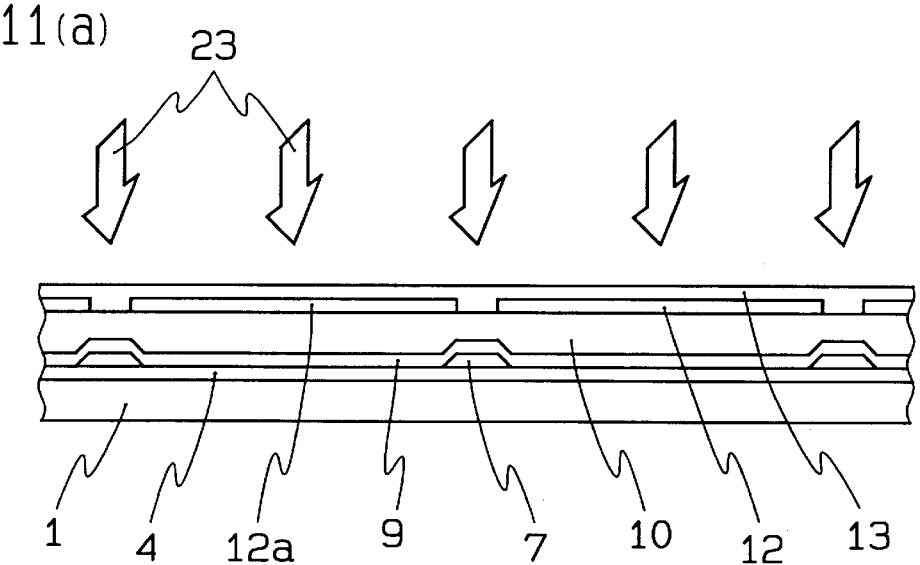
FIGS. 11($a$) to 11($c$) are cross sectional views, each showing a flow of an aligning treatment of EMBODIMENT 3 of the present invention.
Figure 11B:
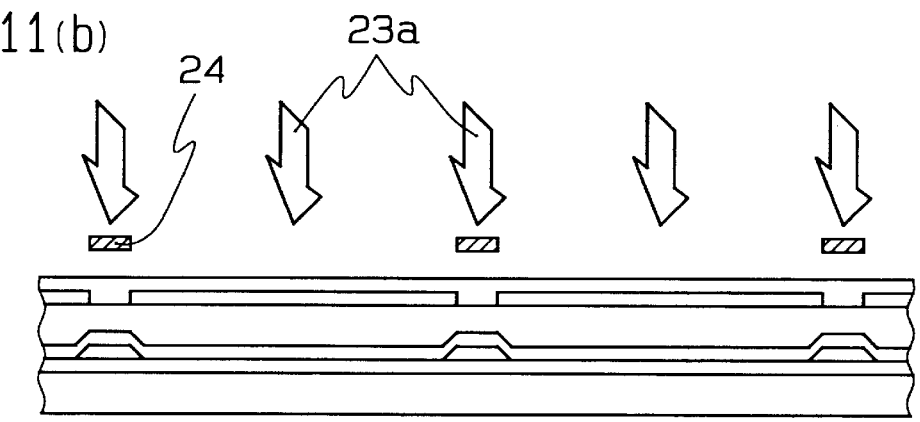
Figure 11C:
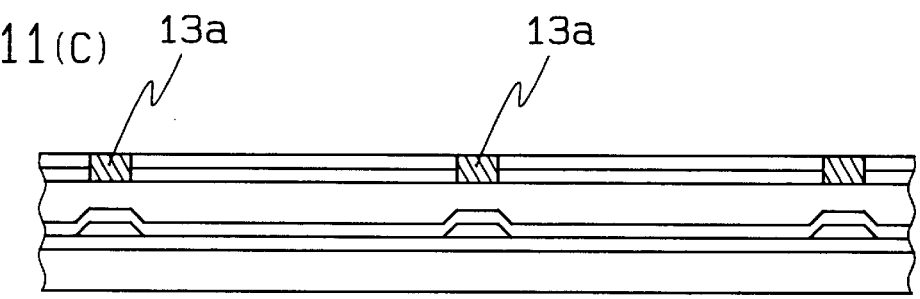

FIG. 11 shows an aligning process for obtaining the liquid crystal displaying apparatus by EMBODIMENT 2. This embodiment is an embodiment showing another manufacturing process of EMBODIMENT 2, and is manufactured by changing the alignment film and the aligning in EMBODIMENT 2. Namely, a light alignment function, i.e., an organic thin film having the alignment function of the liquid crystal in a direction corresponding to the light polarizing direction of the illuminated ultraviolet ray is used for alignment film 13, and only the specific region is aligned by using the light polarizing ultraviolet ray and the mask at the aligning time. The aligning process is described according to FIGS. 11(*a*) to 11(*c*). First, the alignment film 13 to be aligned in a direction corresponding to the polarizing direction of the polarizing ultraviolet ray 23 is coated in a process similar to that of EMBODIMENT 2. Then, the polarizing ultraviolet ray 23 is illuminated upon the whole array substrate. An ultraviolet ray 23*a* polarized in light in a direction different from the first irradiation upon the other portion by light-shielding with a mask 24 a portion where the distortion producing region is provided. Thus, the alignment film processing different in the alignment direction is conducted between a portion where the distortion is provided and a portion except for it. As the manufacturing process except the aligning treatment is the same as EMBODIMENT 2, the description is omitted.

The producing position of the disclination in the liquid crystal displaying apparatus, by the present invention, manufactured in this manner is almost fixed to the end of the distortions. In EMBODIMENT 7 of the present invention, as the producing position of the disclination can be fixed by the processing of the intermediate alignment film 13*a*, it is not necessary to have larger superposition between the signal wiring 7 and the pixel electrode 12. Thus, a liquid crystal displaying apparatus which is high in aperture ratio and free from the cross talk can be provided.

EMBODIMENT 4

Figure 12A:
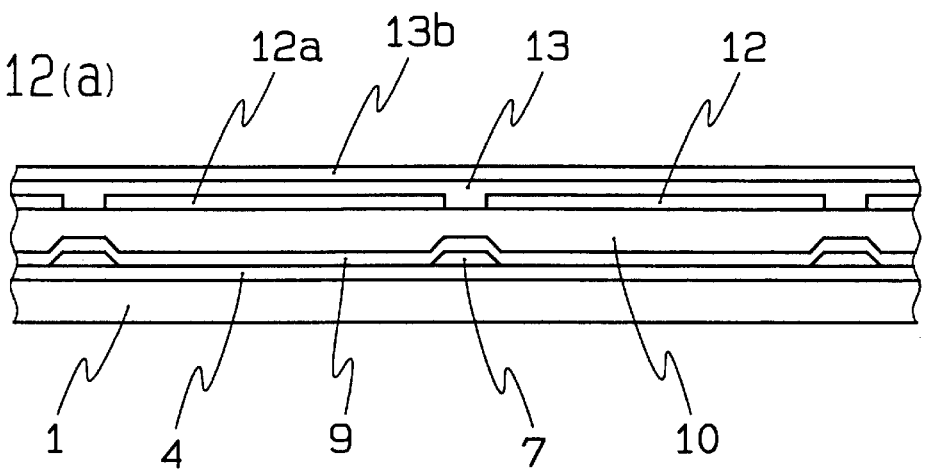
FIGS. 12($a$) to 12($c$) are cross sectional views, each showing a flow of an aligning treatment of EMBODIMENT 4 of the present invention.
Figure 12B:
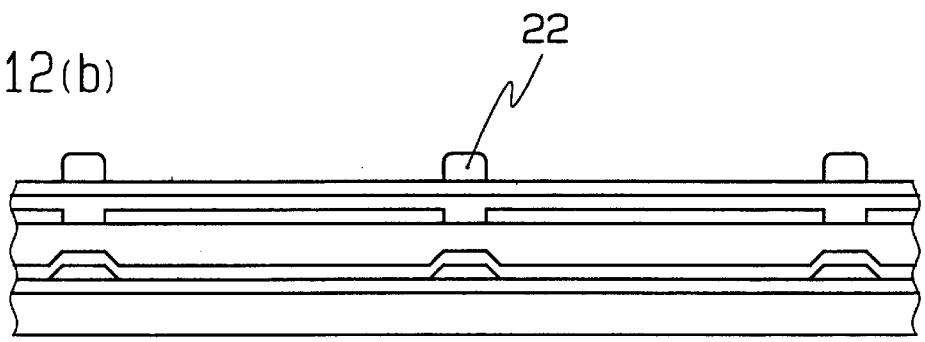
Figure 12C:
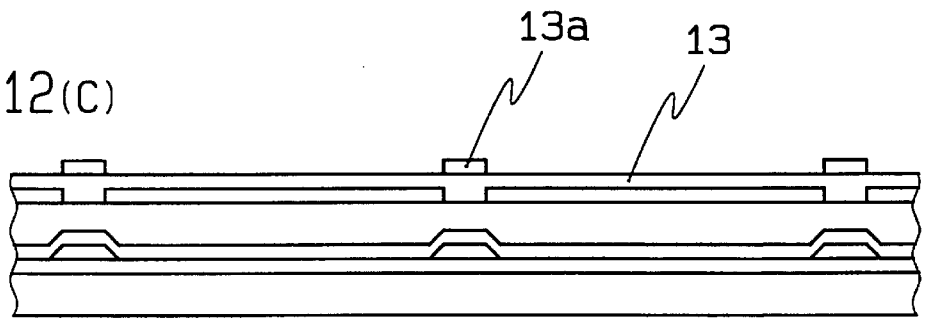
Figure 13A:
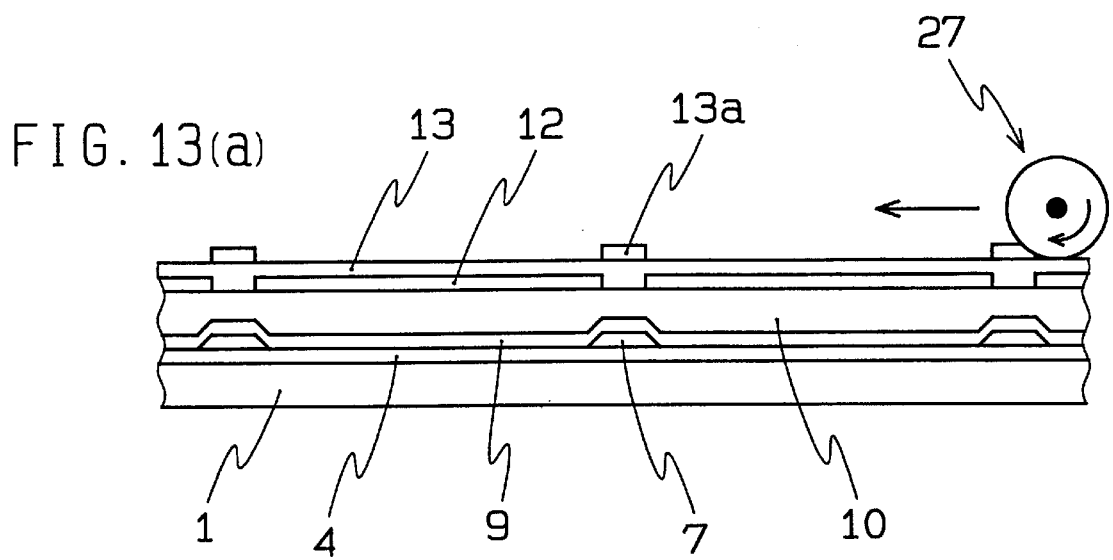
FIGS. 13($a$) and 13($b$) are cross sectional views, each showing a flow of an aligning treatment of EMBODIMENT 4 of the present invention.
Figure 13B:
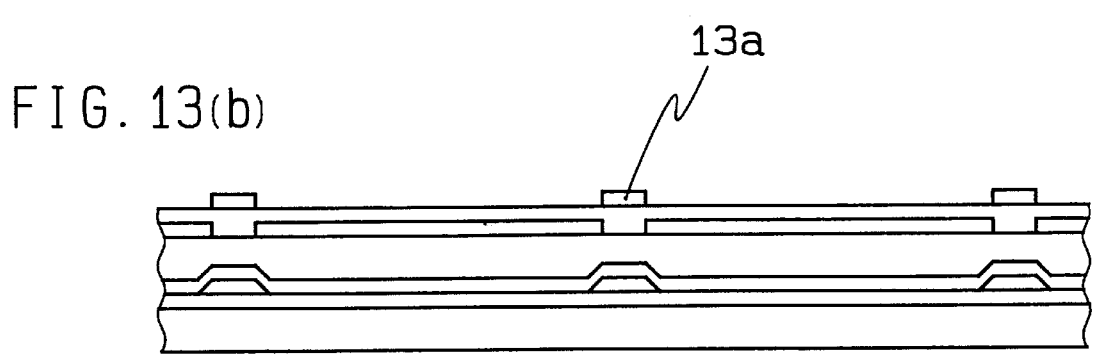

FIGS. 12 and 13 show an aligning process for obtaining a liquid crystal displaying apparatus in the embodiment. This embodiment is an embodiment showing another manufacturing process of EMBODIMENT 2, and is manufactured by changing the alignment film and the aligning process in EMBODIMENT 2. Namely, two-layer alignment film such as polyimide film is used as an alignment film. The first polyimide film 13 is pre-cured and after-cured after, for example, the solution of, for example, polyamic acid is transferred with the transfer plate. After the solution of the solutable polyimide 13*b* is transferred (FIG. 12(*a*)) on it, the pre-cure and the after-cure are conducted. Then, the photoresist 22 is coated on it (FIG. 12(*b*)), and the exposing and etching operations are conducted. The unnecessary portion is removed by etching, of the alignment film 13*a* made of the second-layer soluble polyimide and finally, the photoresist 22 is completely removed (FIG. 12(*c*)). Then, although the whole face is aligned (FIG. 13(*a*)), the aligning treatment is conducted with different aligning strength on the surface of the different intermediate alignment film 13*a*, and the distortion producing region can be provided (FIG. 13(*b*)). As the manufacturing process except the aforementioned description is the same as in EMBODIMENT 4, the description is omitted.

The producing position of the disclination in the liquid crystal displaying apparatus manufactured in this manner, of the present invention, is fixed to the end of the distortion producing region. In EMBODIMENT 8 of the present invention, as the producing position of this disclination can be fixed by the processing of the intermediate alignment film 13*a*, it is not necessary to make the superposing larger between the signal wiring 7 and the pixel electrode 12 large. Thus, a liquid crystal displaying apparatus which is high in aperture ratio and is free from cross talk can be obtained.

EMBODIMENT 5

Figure 14A:
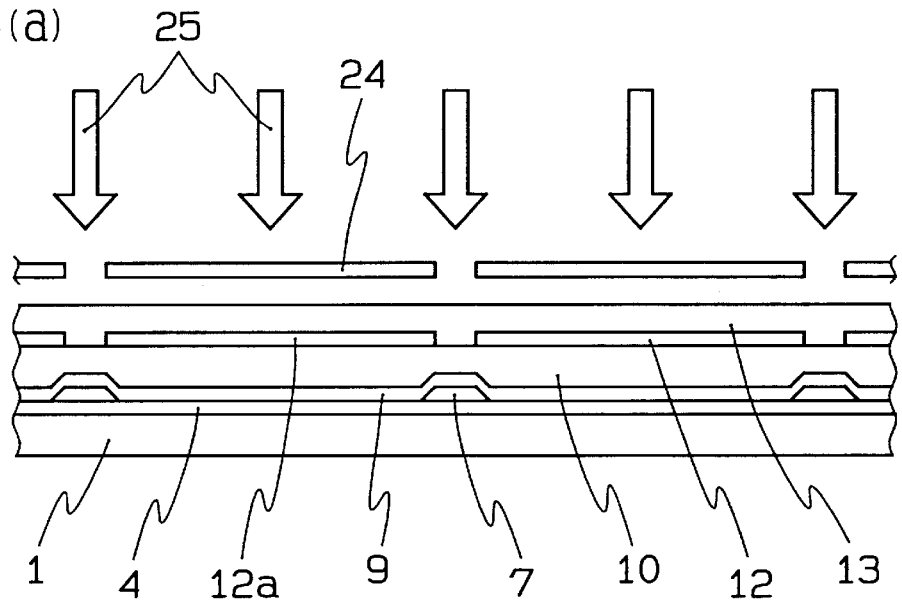
FIGS. 14($a$) and 14($b$) are cross sectional views, each showing a flow of an aligning treatment of EMBODIMENT 5 of the present invention.
Figure 14B:
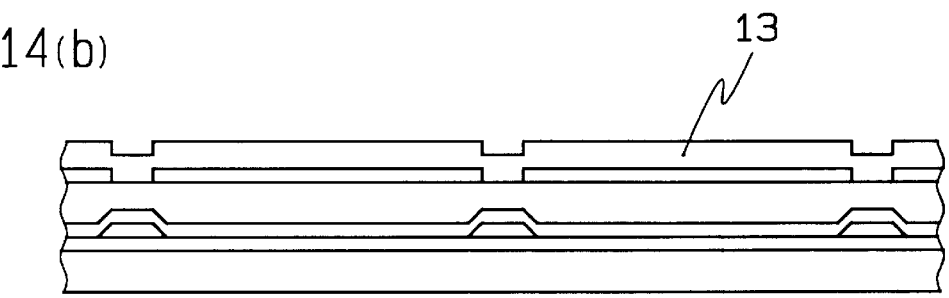

FIGS. 14(*a*) and 14(*b*) and 15(*a*) and 15(*b*) are explaining views showing the aligning process for obtaining the liquid crystal displaying apparatus in this embodiment. This embodiment is an embodiment showing the another manufacturing process of EMBODIMENT 2, and is manufactured by changing the alignment film and the aligning process of EMBODIMENT 2. An aligning process is described according to the FIGS. 14 and 15. This embodiment is the same as the aligning of the alignment film 13 or EMBODIMENT 2, the description is omitted. After the coating of the alignment film 13, the ultraviolet ray 25 is irradiated upon the whole face of the substrate (FIG. 14(*a*)) in a condition where the region where the distortion is not caused by the light screening mask 24. Then, by washing the substrate with γ-butyrolactone, one portion of an ultraviolet-ray irradiated portion of the alignment film 13 is dissolved (FIG. 14(*b*)). Then, the rubbing treatment is conducted by the normal process (FIG. 15(*a*)). As this result, in an intermediate alignment film 13*a* where one portion is dissolved with γ-butyrolactone by irradiating the ultraviolet ray, the aligning strength is weakened as compared with the other alignment film 13, thus resulting in the distortion producing region. Namely, the disclination can be fixed between the adjacent pixels (boundary). As the manufacturing process except the aforementioned description is the same as in EMBODIMENT 2, the description is omitted.

The producing position of the disclination in the liquid crystal displaying apparatus manufactured in this manner, of the present invention, is almost fixed to the end of the distortion producing region. In EMBODIMENT 5 of the present invention, as the producing position of this disclination can be fixed by the processing of the intermediate alignment film 13a, it is not necessary to make the superposing larger between the signal wiring 7 and the pixel electrode 12. Thus, a liquid crystal displaying apparatus which is high in aperture ratio and is free from cross talk can be obtained.

Figure 15A:
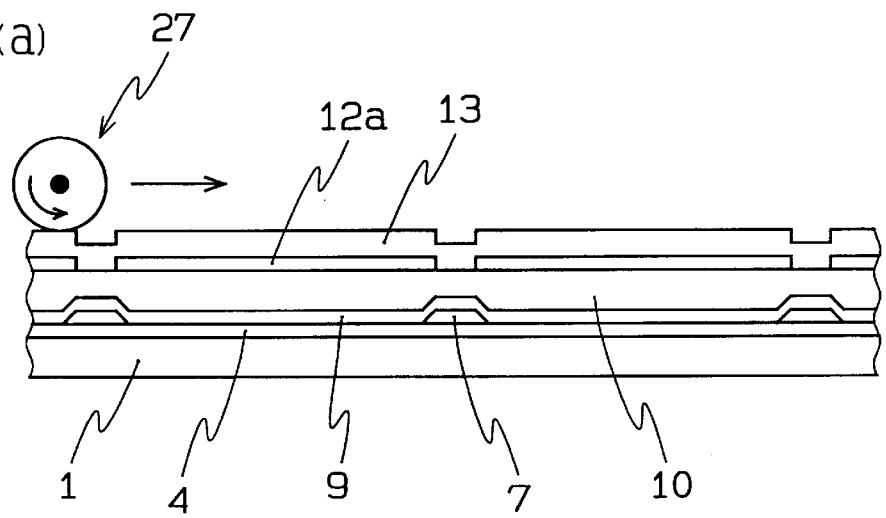
FIGS. 15($a$) and 15($b$) are cross sectional view, each showing a flow of an aligning treatment of EMBODIMENT 5 of the present invention.
Figure 15B:
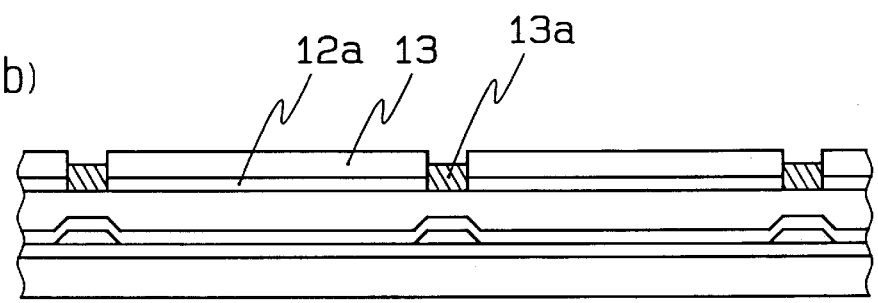

In this embodiment, although the rubbing is treatment conducted after irradiating the ultraviolet, by a method of irradiating the ultraviolet ray with the same process, after the rubbing treatment, namely, even when a step of FIG. 14(a) is replaced by a process of FIG. 15(a), the aligning strength becomes weakened by the dissolution with γ-butyrolactone after irradiating the ultraviolet ray, and the distortion producing region can be produced, and the same effect is obtained.

In EMBODIMENT 1 through EMBODIMENT 5, an embodiment of the liquid crystal displaying apparatus is shown where a position for causing the disclination by controlling the alignment of the liquid crystal molecules is fixed.

The disclination is caused by the lateral electric field between the adjacent pixel electrodes. The embodiment of a liquid crystal displaying apparatus is described wherein the disclination is caused in advance in a region where the light is shielded with the signal wiring by reducing the influences of the lateral electric field by increasing the longitudinal electric field strength by approaching towards the opposite electrode, not towards the end of the adjacent pixel electrode the end of the pixel element on the side where the disclination is caused.

EMBODIMENT 6

Figure 16A:
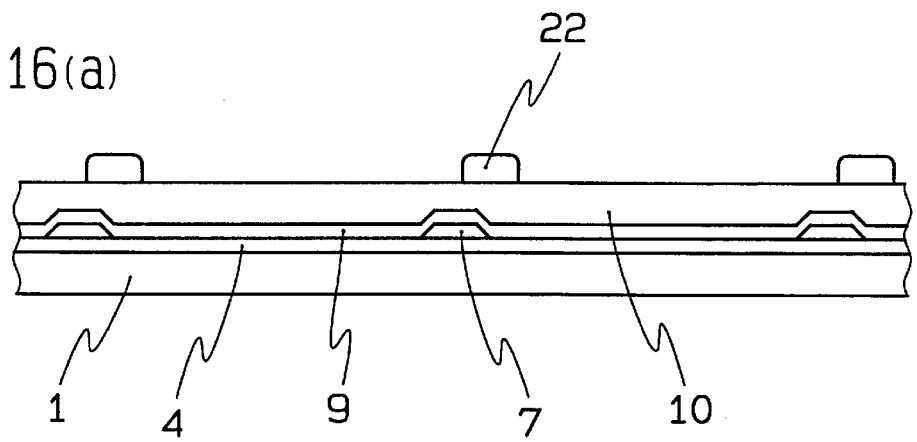
FIGS. 16($a$) to 16($c$) are cross sectional views, each showing a flow for manufacturing an array substrate of EMBODIMENT 6 of the present invention.
Figure 16B:
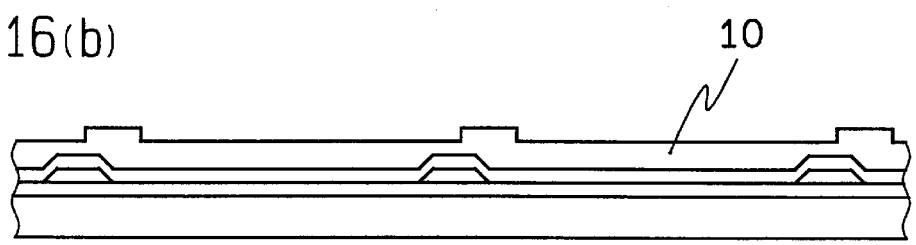
Figure 16C:
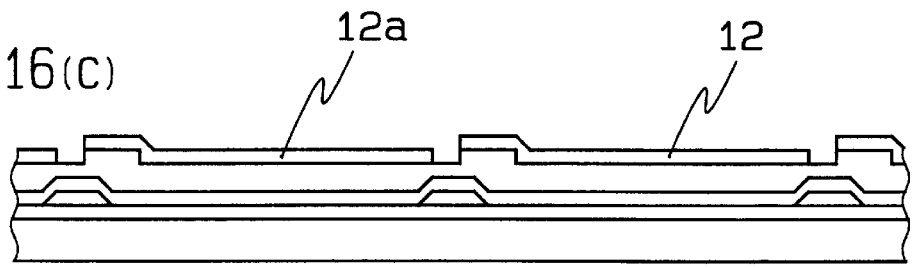

FIGS. 16(a) to 16(c) are a sectional illustrating view showing one embodiment of the present invention. Although the disclination is caused by the lateral electric field strength between the adjacent pixel electrodes 12 and 12a, the influences of the lateral electric field strength can be reduced by increasing the longitudinal strength to be caused between the pixel electrode 12 and the common electrode 18 of the counter substrate. In EMBODIMENT 6 of FIGS. 16(a) to 16(c), by increasing the thickness of the transparent insulating film 10 of one portion on the side of the pixel electrode 12 where the disclination is caused, the longitudinal electric field strength to be caused between the pixel electrode 12 and the common electrode 18 of the counter substrate in this area is increased, so that the disclination may not be visually recognized as the leaking light by coming from the region where the light is shielded with the signal wiring. One example of a manufacturing process is shown. In the manufacturing process of the array substrate, up to a process of coating the transparent insulating film 10 is the same as that of EMBODIMENT 1, the description is omitted. After the transparent insulating film 10 is coated, a developing operation is conducted for forming the contact hole 11 in the desired position. Then, the photo resist is coated by using, for example, a spin coating process, and the removing operation is conducted (FIG. 16(a)) with the photoresist 22 remaining, of one portion of the pixel electrode 12 on the side where the disclination is caused (FIG. 16(a)). In this condition, the etching operation for forming the contact hole 11 is conducted. In this case, when the etching is conducted under the conditions where the etching rate of the protective 9 or the gate insulating film 4 is fast at a selection ratio of 1:1 or more by the etching of the transparent insulating film 10 and the protective film 9 or the gate insulating film 4, the transparent insulating film 10 except for the region covered with the photoresist 22 is removed in one portion of the film by the etching (FIG. 16(b)). Then, for example, ITO is formed as the pixel electrode 12 (FIG. 16(b)). As the following step is the same as that of EMBODIMENT 1, the description is omitted.

In the liquid crystal displaying apparatus to be obtained by the above steps, one portion of the pixel electrode 12 is provided in a position approached more to the common electrode ~ of the counter substrate than in the conventional case and the case explained by EMBODIMENT 1 through EMBODIMENT 6, the longitudinal electric field strength becomes larger in this portion and the influences of the lateral electric field become smaller as compared with the conventional construction. Thus, the disclination stays in a region where the light is shielded by the signal wiring, and the aperture ratio can be made higher, whereby a liquid crystal displaying apparatus which is free from the cross talk can be obtained.

EMBODIMENT 7

Figure 17A:
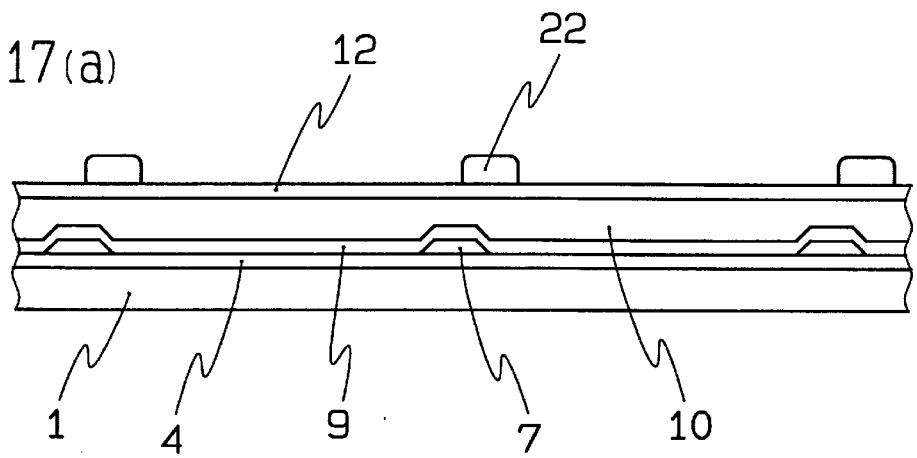
FIGS. 17($a$) to 17($c$) are cross sectional view showing a flow for manufacturing an array substrate of EMBODIMENT 7 of the present invention.
Figure 17B:
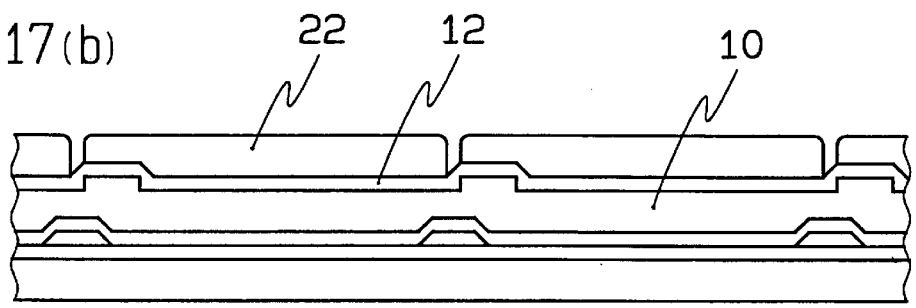
Figure 17C:
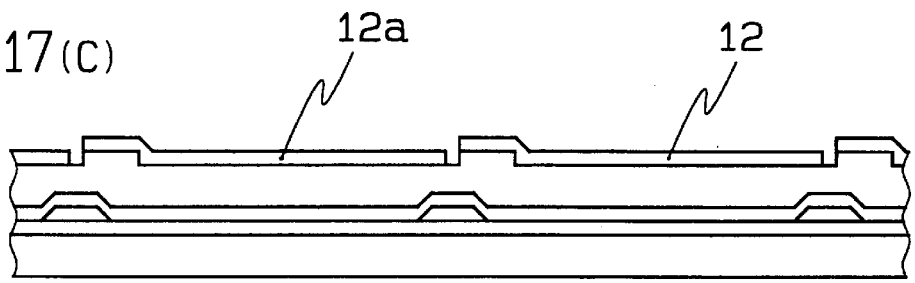

FIGS. 17(a) to 17(c) are an illustrating view showing the other embodiment of a process of reducing the influences of the lateral electric field strength by increasing the longitudinal electric field strength to be caused between the pixel electrode 12 and the common electrode 18 of the counter substrate in the present invention. In EMBODIMENT 7, one portion of the pixel electrode 12 is made two layers. One example of the manufacturing process will be described. As the embodiment is the same as EMBODIMENT 2 up to the pixel electrode 12 is formed, the description is omitted. After the pixel electrode 12b such as ITO is filmed, the photoresist 22 is formed so that only the end portion on the side where the disclination is caused, of the pixel electrode 12b may be superposed partially on the signal wiring 7 (FIG. 17(a)). After the pixel electrode 12b is formed in the desired pattern with the photoresist 22 as a mask is formed, for example, the ITO is filmed again as the pixel electrode 12 and the photoresist 22 is filmed again (FIG. 17(b)) for constructing one pixel. The pixel electrode is formed (FIG. 17(c)) with the photoresist 22 as a mask. As the following process is the same as the other embodiment, the description thereof is omitted. In this embodiment, as one portion on the side of the producing pixel electrode of the disclination, of the adjacent pixel electrode 12 and 12a is formed of two layers, the strength is increased in a portion where the longitudinal electric field strength is formed of two layers. As the disclination can be caused on the signal wiring 7, a liquid crystal displaying apparatus which is high in aperture ratio and is free from the cross talk can be provided. Although one portion of the pixel electrode is formed of two layers of the ITO in this embodiment, a portion which become a lower layer can be an inorganic insulating film such as SiN, $SiO_2$ or the like as the insulating film, and the same effects can be obtained even in the organic insulating film such as acrylic resin and so on.

EMBODIMENT 8

Figure 18:
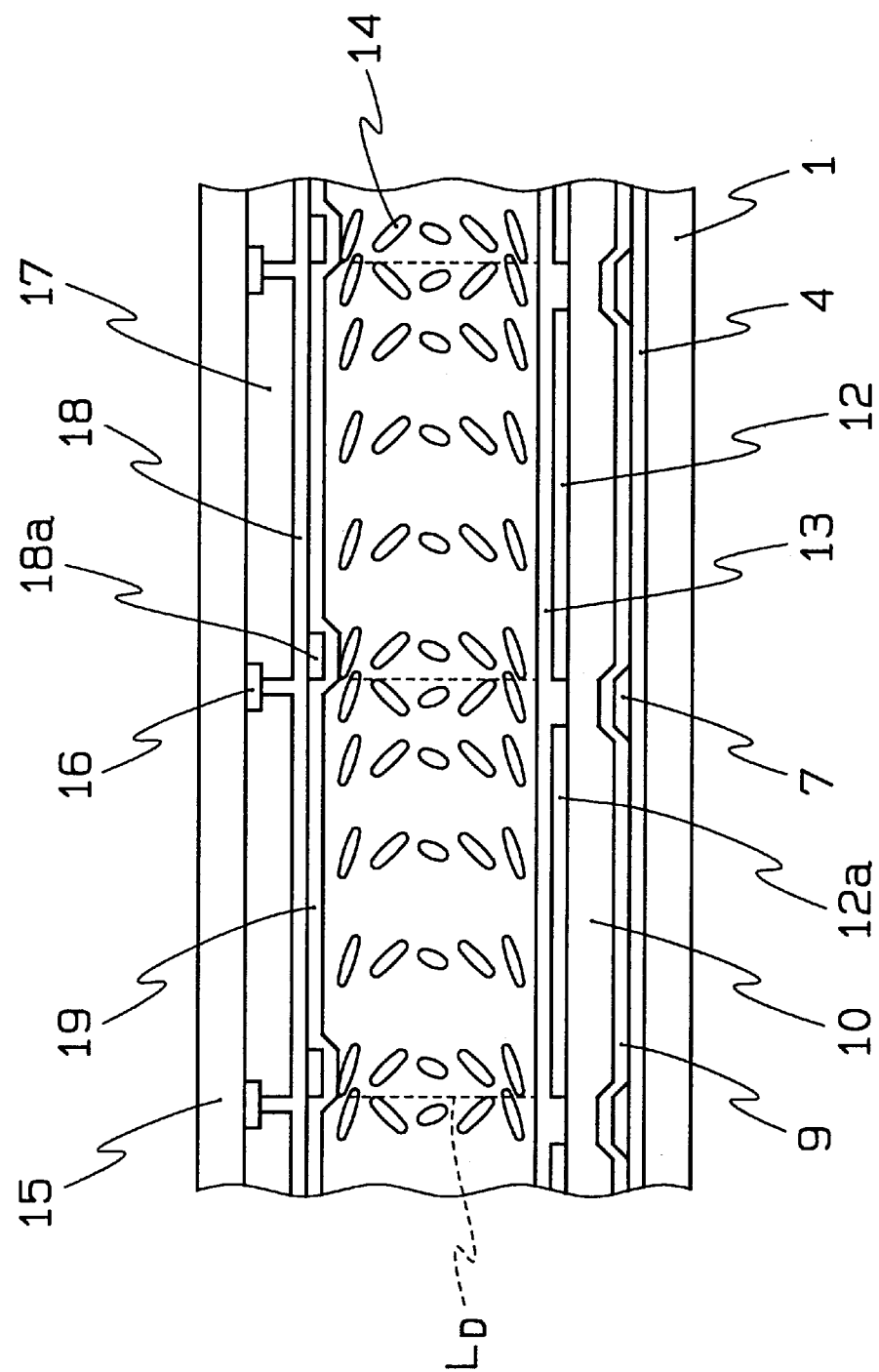
FIG. 18 is a cross sectional view showing a liquid crystal displaying apparatus of EMBODIMENT 8 of the present invention.

In EMBODIMENT 6 and EMBODIMENT 7, to reduce the lateral electric field strength between the pixel electrodes, 12 and 12a closely located each other, the longitudinal electric field strength is increased by provision of a position where one portion of the pixel electrode 12 on the side where the disclination is caused is approached towards the common electrode 18 of the counter substrate, the same effect can be obtained by provision of a position where one portion of the counter substrate side is approached. FIG. 18 is a sectional illustrating view in EMBODIMENT 8 of the present invention. In this embodiment, the manufacturing process of the array substrate is the same as that of EMBODIMENT 2. By increasing the thickness of one portion of, for example, the ITO with the common electrode formed on the counter substrate being as two layers (18 and 18a), positioned on the pixel electrode on the side where the disclination is caused, the longitudinal electric field can be increased, and the disclination can be caused on the signal wiring. A liquid crystal displaying apparatus which is high in aperture ratio and is free from the cross talk can be provided.

EMBODIMENT 9

In EMBODIMENT 1 through EMBODIMENT 5 of the present invention, by making the alignment condition different in the intermediate region of the pixel electrodes 12 and 12a, and the alignment condition on the pixel electrode, the disclination is caused in the intermediate region of the pixel electrodes 12 and 12a and on the signal wiring 7. The embodiment is shown about a process where the alignment condition between the adjacent pixel electrodes is made different.

Figure 19:
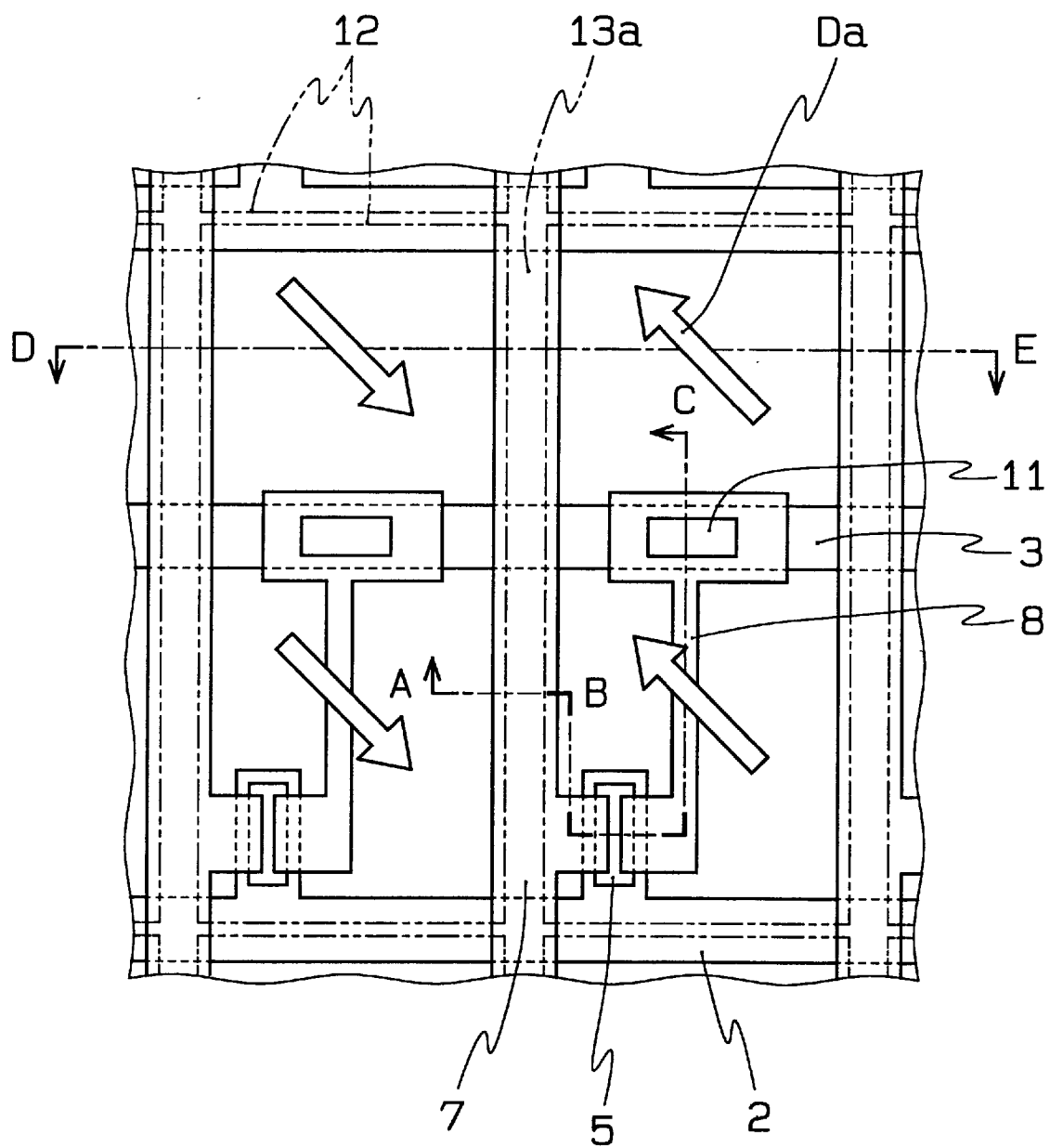
FIG. 19 is a plan view showing a liquid crystal displaying apparatus of EMBODIMENT 9 of the present invention.
Figure 20:
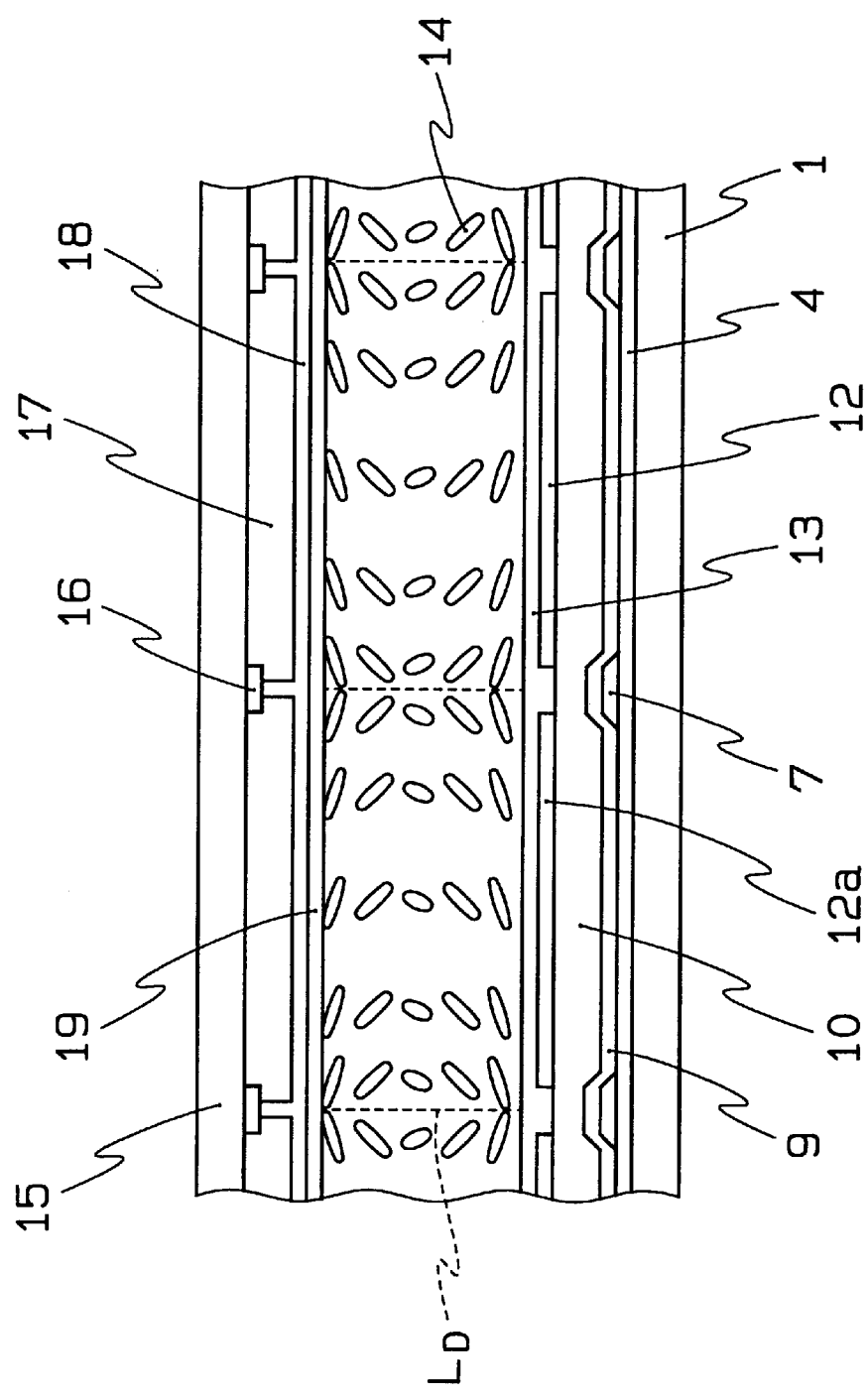
FIG. 20 is a cross sectional view showing a liquid crystal displaying apparatus of EMBODIMENT 9 of the present invention.

FIG. 19 is a plan illustrating view showing the direction Da of the aligning in EMBODIMENT 9 of the present invention. FIG. 20 is a sectional illustrating view taken along a line of D-E of the liquid crystal displaying apparatus in EMBODIMENT 9. In the present embodiment, after rubbing the whole substrate surface, a particular region only is rubbed in a different direction by using a mask made of metal. The metallic makes is a mask where an opening is provided each time one of the adjacent pixels is blown. The alignment direction becomes different for each of the adjacent pixels in this embodiment, and the disclination line is fixed near the boundary. The aligning treatment is conducted so that the alignment direction may become different for each adjacent pixel as in the counter substrate.

In EMBODIMENT 9 of the present invention, as the position of the disclination can be fixed between the adjacent pixels 12 and 12a, it is not necessary to make the superposition larger between the signal wiring 7 and the pixel electrode 12. Thus, a liquid crystal displaying apparatus which is high in aperture ratio and is free from the cross talk can be obtained. Further, in EMBODIMENT 9, the rubbing direction becomes different for each adjacent pixel, and the pretilt direction of the liquid crystal molecule 14 becomes different for each pixel. In EMBODIMENT 9, as the optimum visual angle direction is reversed by 180 degrees for each adjacent pixel as compared with EMBODIMENT 1 through EMBODIMENT 8, the viewing angle of the displaying characteristics of the liquid crystal displaying apparatus becomes wider, with an effect that the visual characteristics are improved.

In this embodiment, although the alignment direction is changed for each pixel, the pixel unit for changing the alignment direction can be optional in number.

EMBODIMENT 10

Figure 21:
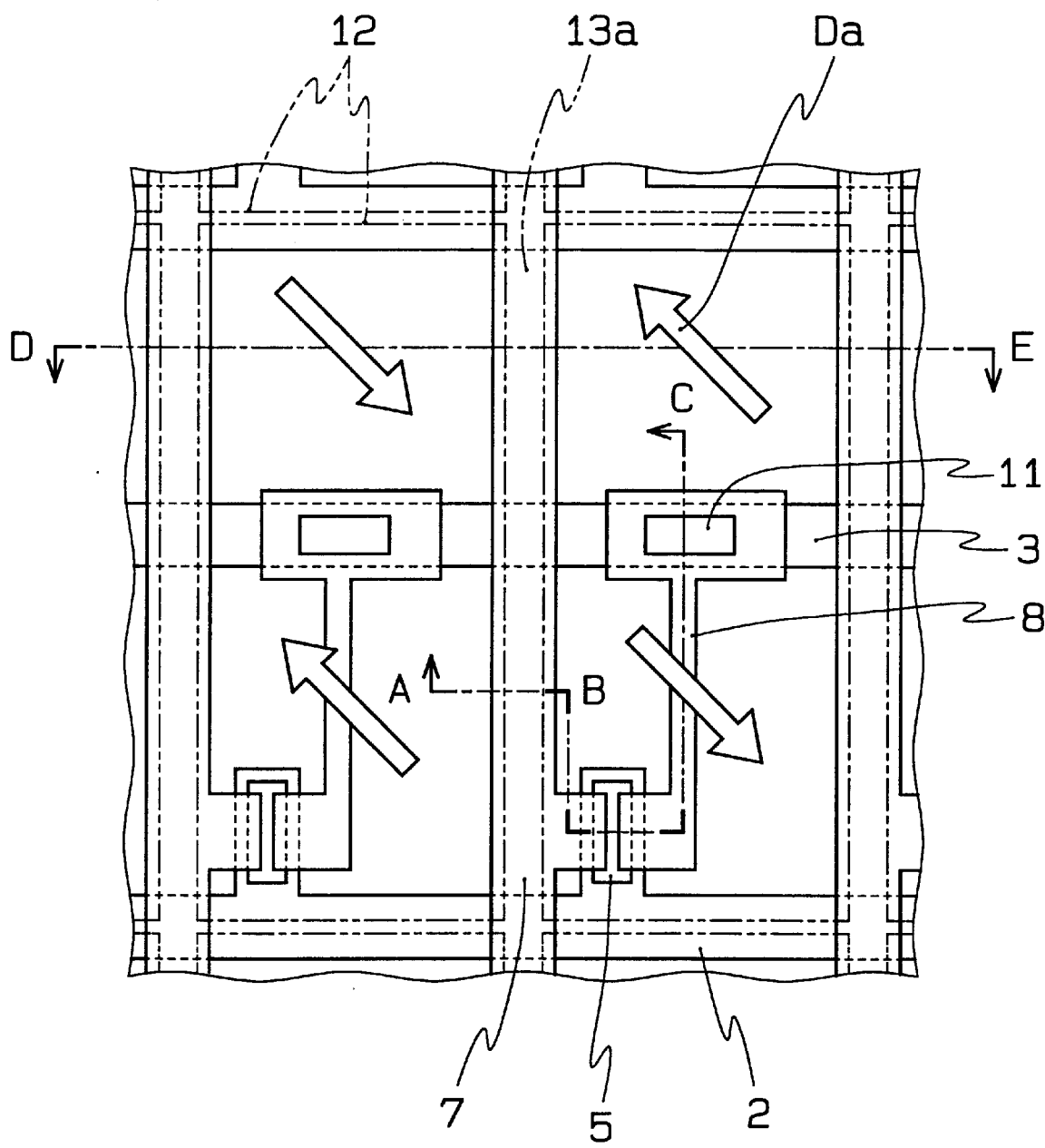
FIG. 21 is a plan view showing a liquid crystal displaying apparatus of EMBODIMENT 10 of the present invention.
Figure 22:
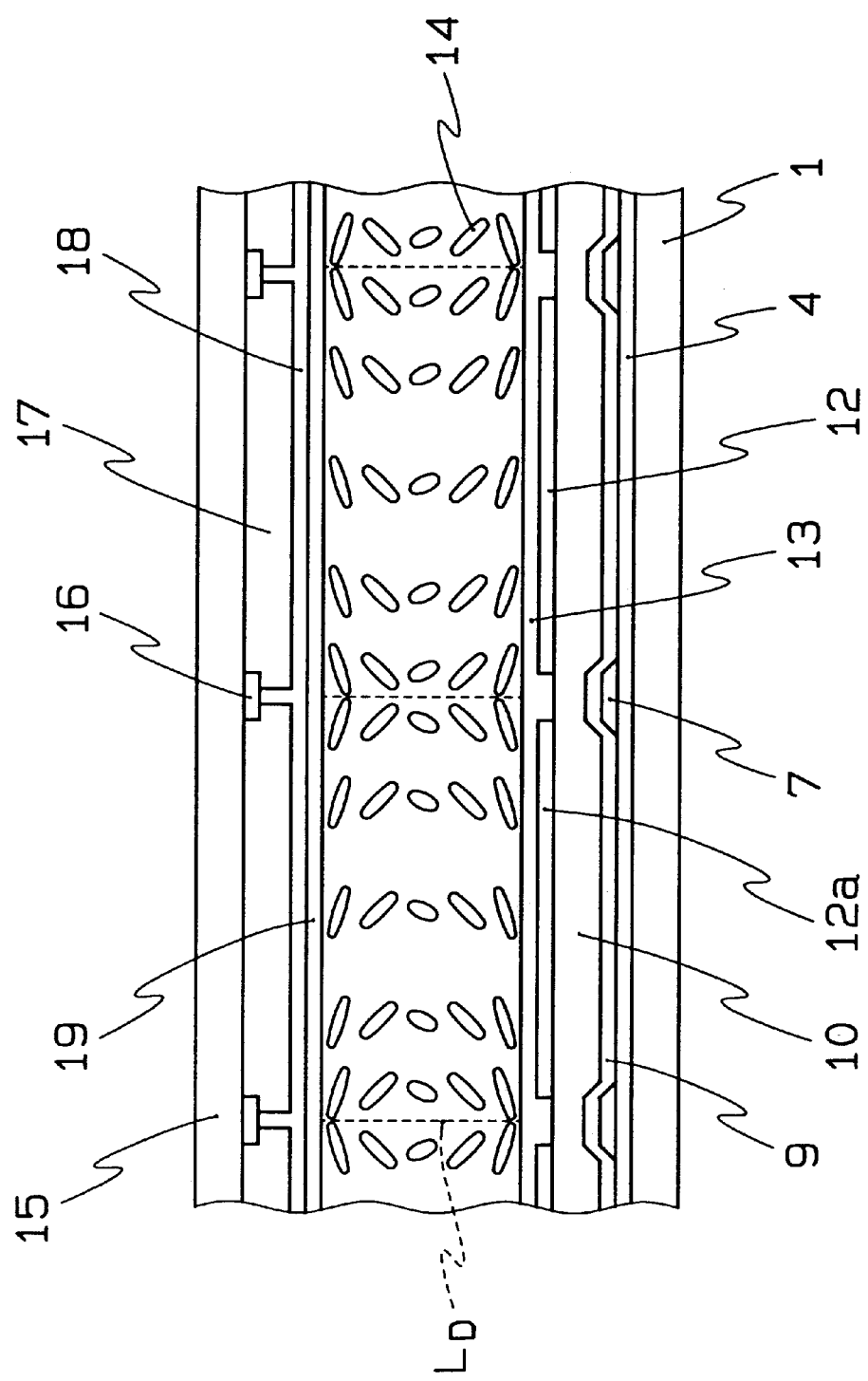
FIG. 22 is a cross sectional view showing a liquid crystal displaying apparatus of EMBODIMENT 10 of the present invention.

In EMBODIMENT 9, after rubbing the whole substrate surface, only the particular region is rubbed in a different direction by using the mask made of metal. The metal mask is a mask where the opening is provided each time each of the adjacent pixels is blown. In EMBODIMENT 10, it is a mask where an opening is provided to change the alignment direction with the CS wiring 3 near the central portion of each pixel as the CS wiring 3. FIG. 21 is a plan illustrating view showing the direction Da of the alignment processing in EMBODIMENT 10. FIG. 22 is a sectional illustrating view taken along a line of D-E (shown in FIG. 1 in EMBODIMENT 1) of the liquid crystal displaying apparatus of EMBODIMENT 10. The same aligning treatment is conducted upon the counter substrate 15. In EMBODIMENT 10, in the upper and lower portions, the alignment direction becomes different for each of the adjacent pixel electrodes and with the CS wring 3 within the pixel as the boundary, and the disclination is fixed near the boundary. In EMBODIMENT 6, although the disclination is caused on both the CS wiring 3 and the scanning wiring 2, not on the signal wiring 7, the disclination can be fixed on the CS wiring 3 or on the scanning wiring 2 by forming the boundary for dividing the alignment in a region where the light is shielded by the CS wiring 3 or the scanning wiring 2 and between the adjacent pixel electrodes 12 and 12a. The manufacturing process in EMBODIMENT 10 is the same as that of EMBODIMENT 9, the description is omitted.

In EMBODIMENT 10 of the present invention, as the position of the disclination can be fixed between the adjacent pixel electrodes, it is not necessary to make the superposing larger between the signal wring 7 and the pixel electrode 12. Thus, a liquid crystal displaying apparatus which is high in aperture ratio and is free from the cross talk can be obtained. In EMBODIMENT 10, the rubbing direction is different is different for each of the mutually adjacent pixels, and different within the pixel, whereby the pretilt direction of the liquid crystal molecule becomes different for each pixel and within the pixel. In EMBODIMENT 10, the viewing angle of the displaying characteristics of the liquid crystal displaying apparatus becomes wider as compared with EMBODIMENT 1 through EMBODIMENT 8 as in EMBODIMENT 9 or in EMBODIMENT 9 or more, with an effect that the viewing angle characteristics are improved.

In this embodiment, the alignment direction is changed for each pixel, and the pixel unit for changing the alignment direction can be optional in number.

Although a channel etch type inverted stagger construction TFT is used as the construction of the TFT in EMBODIMENT 1 through EMBODIMENT 10 of the present invention, the same effect can be obtained even by using the channel protective (etching stopper type) inverted stagger construction TFT. The stagger type TFT can be used. Although a-Si is used as a semiconductor layer 5, a polycrystalline silicon can be used. Although the Cr is used as a scanning wiring 2, a single layer film using one of Al, Cu, Mo, Ta, W, Al—Nd, Al—Cu, Al—Si Cu, Al nitride—Nd or Al—W and so on or a multi-layer film made of laminated layer construction of an appropriate combination of them, or alloy can be used. Although Cr is used as a Cs wiring 3, a single layer film using one of Al, Cu, Mo, Ta, W, Al—Nd, Al—Cu, Al—Si—Cu, Al nitride —Nd or al—W and so on or a multi-layer film made of laminated layer construction of an appropriate combination of them, or alloy can be used. Although Cr is used as a signal wiring 7 or a drain electrode 8, a single layer film using one of Al, Cu, Mo, Ta, W, Al—Nd, Al—Cu, Al—Si—Cu, Al nitride—Nd or al—W and so on or a multi-layer film made of laminated layer construction of an appropriate combination of them, or alloy can be used. The signal wiring 7 can be made of these metal single layers or laminated layer construction, and the drain electrode 8 or one portion of the drain electrode can be formed of the ITO. Although the ITO is used as a pixel electrode 12 or the common electrodes 18 and 18*a* of the counter substrate, the same effect is provided even with $SnO_2$. Although the SiN is used as the gate insulating film 4 or the passivation film 9, $SiO_2$ or laminated layer construction of SiN, or SiN and $SiO_2$ can be used. Although the passivation film 9 is used in the embodiment of the present invention, the same effect is provided even in the construction free from the passivation film 9. Although acrylic resin is used as a transparent insulating film 10, the effect is the same when it is a transparent insulating film such as other organic resin, insensitive resin, benzocyclobutene or the like. Although the Cr is used as BM16 on the counter substrate, a laminated layer construction with $CrO_2$ can be used.

In the intermediate region between the adjacent pixel electrodes in a liquid crystal displaying apparatus described in claim 1 of the present invention, at least one disclination is caused between the adjacent pixel electrodes in advance in a region where the light is shielded with the signal wiring by provision of the intermediate alignment film and the unevenness in the alignment film for giving the distortion to the alignment of the liquid crystal molecule of the liquid crystal layer to the alignment film. The position of the disclination is fixed to a region where the light is shielded by the signal wiring, and a liquid crystal displaying apparatus which is high in aperture ratio and is free from the cross talk can be provided.

In the intermediate region between the adjacent pixel electrodes in a liquid crystal displaying apparatus described in claim 2 of the present invention, the disclination can be caused in advance in a region where the light is shielded with the signal wiring by provision of the intermediate alignment film and the unevenness in the alignment film for giving the distortion to the alignment of the liquid crystal molecule of the liquid crystal layer. The position of the disclination caused by the lateral electric field between the pixel electrodes is fixed to the intermediate region between the pixel electrodes. It is not necessary to make the superposing amount larger between the pixel electrode and the wiring. Thus a liquid crystal displaying apparatus which is high in aperture ratio and is free from the cross talk can be provided.

In a liquid crystal displaying apparatus described in claim 3 of the present invention, the disclination is given in advance to a region where the light is shielded with a signal wiring by forming the alignment film for giving the mutually different distortions to the liquid crystal molecule about the adjacent pixel elements, and at least one disclination is caused between the adjacent pixel electrodes, and the position of the disclination to be caused by the lateral electric field between pixel electrodes is fixed to the intermediate region between the pixel electrodes. It is not necessary to make the superposing amount larger between the pixel electrode and the wiring. Thus, a liquid crystal displaying apparatus which is high in aperture ratio and is free from the cross talk can be provided.

By approaching the end of the pixel electrode on the side where the disclination is caused, of the adjacent pixel electrodes in a liquid crystal displaying apparatus of claim 4 of the present invention is approached towards the opposite electrode, not the end of the adjacent pixel electrode, the longitudinal electric field strength is increased and the influences of the lateral electric field is reduced. By causing the disclination in advance in a region where the light is shielded with the signal wiring, a liquid crystal displaying apparatus which is high in the aperture ratio and is free from the cross talk can be provided.

By approaching the end of the pixel electrode on the side where the disclination is caused, of the adjacent pixel electrodes in a liquid crystal displaying apparatus of claim 5 of the present invention is approached towards the opposite electrode, not the end of the adjacent pixel electrode, the longitudinal electric field strength is increased and the influences of the lateral electric field is reduced. By causing the disclination in advance in the intermediate region between the pixel electrodes, it is not necessary to make the superposing larger between the pixel electrode and the wiring. A liquid crystal displaying apparatus which is high in the aperture ratio and is free from the cross talk can be provided.

In a liquid crystal displaying apparatus described in claim 6 of the present invention, a disclination is given in advance in a region where the light is screened between the adjacent pixels and with the signal wiring by making the alignment direction of the liquid crystal different between the adjacent pixels or the adjacent pixel and within the pixel, the position of the disclination caused with the lateral electric field between the pixel electrodes is fixed in the intermediate region between pixel electrodes by causing at least one disclination between the adjacent pixel electrodes. Thus, it is not necessary to make the superposing amount larger between the pixel electrode and the wiring. Therefore, a liquid crystal displaying apparatus which is high in aperture ratio and free from the cross talk can be provided. The optimum viewing angle direction of the liquid crystal molecule is improved by reversion of 180 degrees for each of the adjacent pixels or each adjacent electrode and within the pixel, the viewing angle characteristics of the liquid crystal displaying apparatus is improved.

By changing the alignment direction between the adjacent pixel electrodes in a liquid crystal displaying apparatus described in claim 7 of the present invention, a disclination is caused in advance in a region where the light is shielded with signal wiring. Thus, a liquid crystal displaying apparatus wide in viewing angle characteristics which is high in aperture ratio and is free from the cross talk can be obtained.

The present invention relates to a manufacturing process of an array substrate described in claim 8 comprising steps of;

(*a*) forming the scanning wiring and the storage capacitance on the transparent insulating substrate, (*b*) forming a gate insulating film by covering the scanning wiring and the storage capacitance wiring and the transparent insulating substrate, (*c*) forming in this sequence a semiconductor layer which becomes a channel on the scanning wiring through the gate insulating film, and a semiconductor layer for ohmic contact, (*d*) forming the signal wiring and the drain electrode and removing the unnecessary portion of the semiconductor layer for the ohmic contact to have a TFT, (*e*) forming in this sequence the protective film and the transparent insulating film by covering the TFT, the signal wiring and the drain electrode, (*f*) forming a contact hole in the protective film and the transparent insulating film on the storage capacitance wiring, (*g*) forming photo resist after the pixel electrode film is filmed on the transparent insulating film, and forming a pattern in the desired shape, (h) etching the transparent insulating film with the pixel electrode as a mask to form the concave portion on the periphery of the pixel electrode, (i) forming the alignment film by covering the pixel electrode, the signal wiring and the contact hole, and (j) a step of rubbing the alignment film to have an intermediate alignment film where the strength of the alignment by the rubbing to the concave is different from that of the other region. An intermediate alignment film can be formed by making the strength of the alignment different from that in the other region by rubbing to the concave portion by forming the concave portion in the periphery of the pixel electrode without changing the manufacturing process large.

What is claimed is:

1. A liquid crystal displaying apparatus comprising:

a plurality of scanning wiring and a plurality of signal wiring arranged respectively in a row direction and a column direction to form a matrix shape;

an active element controlled by the scanning wiring and the signal wiring;

a pixel electrode connected with the active element, the pixel electrode being superposed on the scanning wiring and the signal wiring through a transparent insulating film;

an array substrate having a first alignment film formed to cover the pixel electrode;

a common electrode placed opposite to the pixel electrode;

a counter substrate having a second alignment film formed on the common electrode;

an intermediate alignment film formed only in an intermediate region between adjacent pixels on the first and second alignment films to give a liquid crystal molecule different distortions about the intermediate region between adjacent pixels; and a liquid crystal layer, wherein the liquid crystal molecule in the liquid crystal layer is aligned by the intermediate alignment film in a space between the array substrate and the counter substrate.

2. The liquid crystal displaying apparatus of claim 1, wherein the intermediate alignment film produces a disclination in advance in the intermediate region outside of the pixel electrode.

3. The liquid crystal displaying apparatus of claim 2, wherein the intermediate alignment film prevents a reverse tilt region caused by a lateral electric field from entering the pixel electrode.

4. The liquid crystal displaying apparatus of claim 3, wherein in the pixel electrode, influence of the lateral electric field from adjacent pixel electrodes is lowered by making a longitudinal electric field stronger in the pixel electrode on the side of the pixel electrode where the disclination is caused.

5. A method for manufacturing an array substrate comprising the steps of:

forming scanning wiring and a storage capacitance on a transparent insulating substrate;

forming a gate insulating film by covering the scanning wiring, the storage capacitance, and the transparent insulating substrate;

forming a semiconductor layer which becomes a channel and a semiconductor layer for ohmic contact on the scanning wiring;

forming signal wiring and a drain electrode and removing an unnecessary portion of the semiconductor layer for the ohmic contact to produce a TFT;

forming a protective film and a transparent insulating film by covering the TFT, the signal wiring and the drain electrode;

forming a contact hole in the protective film and the transparent insulating film;

forming a pixel electrode into a defined pattern on the transparent insulating film;

forming an alignment film by covering the pixel electrode, the signal wiring and the contact hole;

rubbing the alignment film in a first direction;

forming a photo resist on the alignment film; and rubbing the alignment film and the photo resist in an opposite direction to have an intermediate alignment film formed only in an intermediate region between adjacent pixels in which an alignment strength produced by rubbing at the photo resist is different from that of other regions on the alignment film.

\* \* \* \* \*